United States Patent
Trostle et al.

(10) Patent No.: US 7,916,739 B2
(45) Date of Patent: Mar. 29, 2011

(54) LOCATION PRIVACY FOR INTERNET PROTOCOL NETWORKS USING CRYPTOGRAPHICALLY PROTECTED PREFIXES

(75) Inventors: Jonathan Trostle, San Jose, CA (US); Muhammad Mukarran Bin Tariq, Rawalpindi (PK); Hosei Matsuoka, Kanagawa (JP); James Kempf, Mountain View, CA (US); Ravi Kumar Jain, Palo Alto, CA (US); Toshiro Kawahara, Saratoga, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1874 days.

(21) Appl. No.: 10/851,846

(22) Filed: May 20, 2004

(65) Prior Publication Data
US 2005/0041675 A1   Feb. 24, 2005

Related U.S. Application Data

(60) Provisional application No. 60/482,350, filed on Jun. 24, 2003, provisional application No. 60/500,175, filed on Sep. 3, 2003.

(51) Int. Cl.
H04L 12/28 (2006.01)
H04L 12/56 (2006.01)

(52) U.S. Cl. ..................................................... 370/401

(58) Field of Classification Search .................. 370/401, 370/466, 400, 382, 395, 389, 392, 229, 408, 370/409, 473, 464, 254, 388, 360, 447, 462, 370/397, 230, 410, 402, 412, 349, 236, 356, 370/328; 709/242, 238, 220, 221, 201, 246, 709/245, 243, 239, 250, 226, 227, 229, 247, 709/223, 231, 241; 713/150, 162, 153, 163, 713/201, 154, 170, 160, 171, 161; 712/22, 13, 43; 375/140; 726/13; 455/331, 466, 413, 522, 412, 450, 428, 445

See application file for complete search history.

(56) References Cited

U.S. PATENT DOCUMENTS

| | | | |
|---|---|---|---|
| 6,055,575 A * | 4/2000 | Paulsen et al. | 709/229 |
| 6,240,514 B1 * | 5/2001 | Inoue et al. | 713/153 |
| 6,442,687 B1 | 8/2002 | Savage | |
| 6,502,135 B1 | 12/2002 | Munger et al. | |
| 6,684,331 B1 * | 1/2004 | Srivastava | 713/163 |
| 6,816,966 B1 * | 11/2004 | Gupta et al. | 713/163 |
| 6,826,684 B1 * | 11/2004 | Fink et al. | 713/160 |
| 6,963,575 B1 * | 11/2005 | Sistanizadeh et al. | 370/404 |
| 7,099,955 B1 * | 8/2006 | Gregg et al. | 709/238 |
| 7,107,068 B2 * | 9/2006 | Benzon et al. | 455/466 |
| 7,307,990 B2 * | 12/2007 | Rosen et al. | 370/392 |

(Continued)

OTHER PUBLICATIONS

Hinden R. et al., "Internet Protocol Version 6 (Ipv6) Addressing Architecture," RFC 3513, Apr. 2003.

(Continued)

*Primary Examiner* — Pankaj Kumar
*Assistant Examiner* — Prenell P Jones
(74) *Attorney, Agent, or Firm* — Haynes & Boone, LLP.

(57) ABSTRACT

Cryptographically Protected Prefixes ("CPPs") are used to create IP addresses, preventing any correlation between a CPP IP address and a host's geographic location. An IP address is subdivided into address prefixes of multiple segments. Each segment is encrypted with a cryptographic key known only to a subset of routers in the access network domain (or Privacy Domain). Therefore, each router obtains the information it needs to forward a packet of information, but not any additional information.

61 Claims, 21 Drawing Sheets

U.S. PATENT DOCUMENTS

| | | | |
|---|---|---|---|
| 7,380,124 B1* | 5/2008 | Mizell et al. | 713/171 |
| 7,421,082 B2* | 9/2008 | Kamiya et al. | 380/278 |
| 7,734,913 B2* | 6/2010 | Morino et al. | 713/161 |
| 2002/0080798 A1* | 6/2002 | Hariguchi et al. | 370/395.31 |
| 2002/0101873 A1* | 8/2002 | Perlman et al. | 370/400 |
| 2002/0106086 A1* | 8/2002 | Kamiya et al. | 380/277 |
| 2002/0169953 A1* | 11/2002 | Moharram et al. | 713/151 |
| 2004/0010616 A1* | 1/2004 | McCanne | 709/238 |
| 2004/0054807 A1* | 3/2004 | Harvey et al. | 709/243 |
| 2004/0054887 A1* | 3/2004 | Paulsen et al. | 713/154 |
| 2004/0088544 A1* | 5/2004 | Tariq et al. | 713/162 |
| 2004/0093521 A1* | 5/2004 | Hamadeh et al. | 713/201 |
| 2005/0152305 A1* | 7/2005 | Ji et al. | 370/328 |
| 2006/0221954 A1* | 10/2006 | Narayan et al. | 370/389 |
| 2007/0104202 A1* | 5/2007 | Tariq et al. | 370/392 |
| 2008/0091946 A1* | 4/2008 | Paulsen et al. | 713/170 |

OTHER PUBLICATIONS

Hinden R. et al., "IPv6 Global Unicast Address Format," Internet draft, Jul. 1998.

Johnson, D., et al., "Mobility Support in IPv6," Internet draft, Jun. 30, 2003.

Syverson, P.F., et al., "Anonymous Connections and Onion Routing," Proceedings of the 1997 IEEE Symposium on Security and Privacy, Oakland, CA IEEE CS Press, May 1997, pp. 44-54.

Boucher, P. et al., "Freedom System 2.0 Architecture," Dec. 18, 2000.

Goldberg, I., "A Pseudonymous Communications Infrastructure for the Internet," Ph.D. dissertation, University of California, Berkeley, 2000.

Escudero, A., et al., "Flying Freedom: Location Privacy in Mobile Interworking," Proceedings of INET 2001, Stockholm, Sweden, Apr. 26, 2001.

Song, R., et al., "Review of Network-based Approaches for Privacy," Proceedings of the $14^{th}$ Annual Canadian Technology Security Symposium, Ottawa, ON, May 13-17, 2002.

Soliman, H., et al., "Hierarchical Mobile IPv6 mobility management (HMIPv6)", Internet draft, Feb. 2004.

IAB and IESG, "IAB/IESG Recommendations on IPv6 Address Allocations to Sites," RFC 3177, Sep. 2001.

Droms, R., (ed) Dynamic Host Configurations Protocol for IPv6 (DHCPv6), Internet Draft, Jul. 2003.

Narten, T., et al., "Neighbor Discovery for IP Version 6 (IPv6)", RFC 2461, Dec. 1998.

Thomson, S., et al., "IPv6 Stateless Address Autoconfiguration," RFC 2462, Dec. 1998.

Deering, S., et al., Internet Protocol Version 6 (IPv6) Specification, RFC 2460, Dec. 1998.

Bellare, M., et al., "Random Oracles are Practical: A Paradigm for designing Efficient Protocols," Pro. of the 1st Annual Conf. on Computer and Communications Security, ACM Press, Nov. 1993, pp. 62-73.

Stinson, D.R., "Some Observations on the Theory of Cryptographic Hash Functions," Sep. 2002.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |    Offset     | Prefix Length |
+-+-+-+-+-+-+-+-+-+-+-+-+-+-+-+-+-+-+-+-+-+-+-+-+-+-+-+-+-+-+-+-+
|       Encrypted Prefix        | Target Level  |
+-+-+-+-+-+-+-+-+-+-+-+-+-+-+-+-+-+-+-+-+-+-+-+-+
```
                                    ↘60

Figure 6

LOCATION PRIVACY FOR INTERNET PROTOCOL NETWORKS USING CRYPTOGRAPHICALLY PROTECTED PREFIXES

CROSS-REFERENCE TO RELATED APPLICATIONS

This application claims the benefit of Provisional Application Nos. 60/482,350 (filed Jun. 24, 2003) and 60/500,175 (filed Sep. 3, 2003). The present application incorporates the disclosure of these provisional applications by reference.

FIELD OF THE INVENTION

This invention relates to computer network security, and in particular to techniques for denying location address information to potential attackers.

BACKGROUND OF THE INVENTION

Internet Protocol ("IP") addressing, such as IPv6 (Internet Protocol version 6), can reveal information about the geographic location of users, providing hackers and other antagonists with the ability to locate users and/or track users' whereabouts. Information is revealed in IP addressing because topological locations in Internet Protocol addresses correlate with specific geographical locations. For example, IPv6 uses a fixed subnet prefix (typically 64 bits in length). Because the subnet prefix appears as clear text in the IPv6 address, and the IPv6 address appears in the packet header of any transmitted information, an antagonist is provided with enough data to create a topological-to-geographical index. Consequently, the antagonist may employ such a correlation of data to pinpoint the geographic location of those using the network.

The field of network security that addresses the previous problem is known as "location privacy security." Previous schemes attempting to address location privacy security are deficient for various reasons. For instance, in what is known as "Onion" routing, the system is vulnerable to eavesdroppers on the links between the last hop overlay router of a network and the two corresponding hosts. Onion routing also does not protect the location of an end host from malicious software running on the host. Further, common forms of Internet Protocol security (such as the IPsec standard promulgated by the Internet Engineering Task Force, or the IETF) cannot be used with Onion routing. Additionally, Onion routing adds significant delays to information routing.

Applications such as Freedom Network (a product by Zero-Knowledge Systems, Inc.) are also deficient, for similar reasons. For instance, Freedom Network does not protect the location of an end host from malicious software running on the host. Further, Freedom Network cannot protect the location privacy of a host that uses IPsec, since a network filter using Freedom Network is unable to change the source Internet Protocol ("IP") address. Additionally, the use of Freedom Network adds a significant delay to routing.

Recent attempts to provide location privacy security include the encryption of IP addresses with a single secret key (such a system is disclosed, for example, in copending, commonly assigned, U.S. application Ser. No. 10/284,739). However, compromise of the single secret key may leave open the possibility that an antagonist could have access to the entire privacy domain.

SUMMARY OF THE INVENTION

Therefore, it is a general object of the present invention to provide a network with location privacy through the use of Internet Protocol addressing utilizing cryptographically protected prefixes. The present invention maintains a degree of location privacy even when a secret key is compromised, from malicious software running on the host, and even when a router is compromised. Further, the present invention denies eavesdroppers the ability to use IP address information to pinpoint the geographic location of users. Further, the present invention provides proof of security and network robustness, and does so without tunneling and without negative reactions when run in conjunction with IPsec and other security protocols, such as the case where Network Address translators do not operate well with end-to-end security schemes.

BRIEF DESCRIPTION OF THE DRAWINGS

The invention, both as to its organization and manner of operation, may be further understood by reference to the drawings that include FIGS. 1-21, taken in connection with the following detailed description.

FIG. 6 illustrates an exemplary embodiment of the invention including a hop-by-hop option;

DETAILED DESCRIPTION OF EMBODIMENTS

Figure 1:
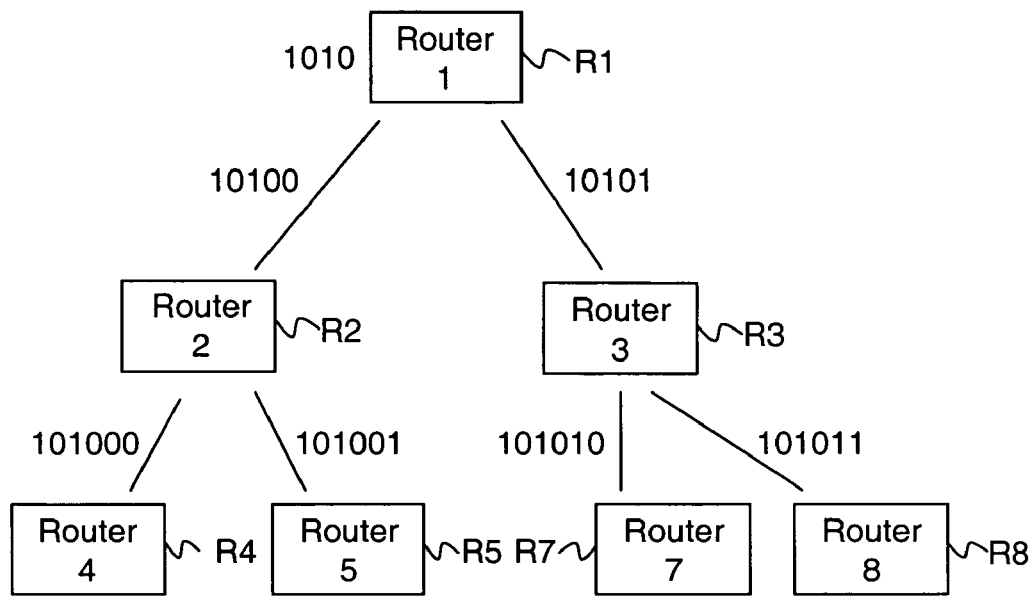
FIG. 1 illustrates an example network utilizing cryptographically protected prefixes (CPPs) in accordance with an embodiment of the invention.
Figure 1:
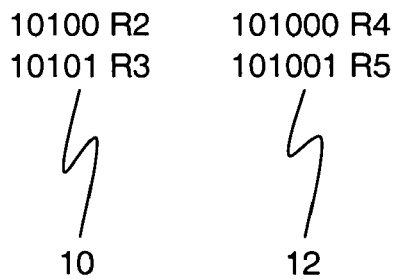

The following description of illustrative non-limiting embodiments of the invention discloses specific configurations and components. However, the embodiments are merely examples of the present invention, and thus, the specific features described below are merely used to describe such embodiments and to provide an overall understanding of the present invention.

Accordingly, skilled artisans readily recognize that the present invention is not limited to the specific embodiments described below. Furthermore, the descriptions of various configurations and components of the present invention that are known to one skilled in the art are omitted for the sake of clarity and brevity.

While IPv6 is used herein as an example of Internet Protocol addressing, the present invention also applies to IP version 4 and other protocols.

An exemplary embodiment of the present invention uses Cryptographically Protected Prefixes ("CPPs") to create IP addresses. Accordingly, any correlation between a CPP IP address and a host's geographic location is not readily available. In utilizing CPPs, an IP address is subdivided into address prefixes of multiple segments. Each segment is encrypted with a cryptographic key known only to a subset of routers in the access network domain (or Privacy Domain—"PD"). Therefore, each router obtains the information it needs to forward a packet of information, but not any additional information.

The routers are divided into subsets called levels. In various embodiments, sets of routers belonging to a given level all share a single cryptographic secret key. Additionally, every router may share a unique dynamic secret session key with each of its directly attached peers (where a peer may be considered directly attached when two routers share a layer 2 link). The keys of the second set are referred to as "link" keys.

When an inbound packet arrives at a CPP border router in a CPP privacy domain, the CPP border router uses its level key to decrypt the first part of the prefix. Based on this decrypted prefix component, the border router forwards the packet to the next hop router in the PD. Additionally, the border router includes the initial decrypted prefix component encrypted in the shared link key, in a hop-by-hop option. The next hop router decrypts the initial prefix component from the hop-by-hop option, using the shared link key. Then, the next hop router uses its level key to decrypt the second prefix component from the CPP IP destination address. It concatenates the first prefix component from the hop-by-hop option with the second prefix component from the level key decryption, and forwards the packet based on an algorithm that matches the concatenated prefix components with the forwarding table entries.

The forwarded packet also includes a new hop-by-hop option, containing the concatenated prefix components, encrypted with the link key shared with the new next hop router. In this way, the destination IP address prefix components are decrypted, until the packet is delivered to the access router that the destination host is attached to. The entire prefix is available to the access router, so it is able to obtain an exact match with an entry in the forwarding table. Accordingly, CPPs require some additional servers such as address servers and key generation servers to create and issue CPP addresses, and to help manage keys on routers (these are described in more detail herein).

FIG. 1 illustrates inbound routing utilizing CPPs in an example network. In the example network, IP addresses have 6 bit prefixes (while 6 bits are used for illustration, it is readily apparent to the ordinarily skilled artisan that prefixes with any number of bits may be used, for example, an IPv6 network may employ 64 bit prefixes). Each link is labeled with the prefix that the furthest router from the root, R1, advertises to the router closest to the root. For example, R2 advertises the prefix 10100 to R1. A user host is attached to access router R5. The 6 bit prefix for R5 is 101001.

The user host would obtain an IP address as follows: the prefix 101001 is composed of the three prefix components:
P0=1010,
P1=0,
P2=1.

P0 is the prefix component that is advertised to the outside world. The suffix for the IP address is M, and M is randomly generated. Further:
X1=H(K1, M) XOR P1,
X2=H(K2, M) XOR P2.

Only the first bit of H(Ki,M), i=1, 2, is used as an exclusive OR function, or XOR. The key K1 is a secret key known to R1, and the key K2 is a secret key known to R2 and R3. K1 and K2 are level keys. The user's IP address is: Addr=P0, X1, X2, M (where A, B denotes the concatenation of strings A and B).

In FIG. 1, R1 is the border router which receives a packet which is destined to the user's host. It uses key K1 to compute P1=X1 XOR H(K1, M)=0. It then forms the prefix 10100 (by concatenating P0=1010 and P1=0) and performs a longest match against its forwarding table 10 entries: 10100 and 10101. A successful match against 10100 causes R1 to route the packet to R2. R1 includes the prefix 10100 in a hop-by-hop option, encrypted in the key it shares with R2. R2 obtains 10100 by decrypting the hop-by-hop option.

R2 uses key K2 to compute P2=X2 XOR H(K2, M)=1. R2 then forms the prefix 101001 (by concatenating the hop by hop prefix 10100 and P2=1) and performs a longest match against its forwarding table 12 entries: 101000 and 101001.

The longest match yields 101001 and R2 forwards the packet to R5, along with the prefix 101001, encrypted in a hop-by-hop option. R5 decrypts 101001 and forwards the packet out the local interface to the user host, since it has obtained an exact match.

One benefit provided by CPPs is that the amount of information available to each router is minimized. For example, R1 only learns that the packet is destined for a host under the tree rooted at router R2. Therefore, the compromise of the secret keys known by R1 only results in a partial loss of location privacy, as compared to the loss that could occur in the IP address scrambling scheme described in U.S. application Ser. No. 10/284,739, for example.

In additional embodiments, the present invention also utilizes what is called aggregation in conjunction with CPPs. In order to reduce the number of entries in router forwarding tables, routers may be configured to aggregate incoming router advertisements such that several incoming prefixes are aggregated into a single outgoing prefix advertisement. For example, in FIG. 1 R2 takes the incoming advertisements 101000 and 101001 and aggregates them into the single outgoing advertisement 10100. Other routers forward any prefix that begins with 10100 to R2.

In aggregation, the prefix P is composed of two strings: $P_0$ and $P_s$, where $P_0$ is the global routing prefix advertised to the Internet from the PD, and $P_s$ is the subnet prefix that is used to route packets within the PD. Aggregation within the internal PD routers is used to subdivide $P_s$.

A general routing example is exemplified by G=(V, E) where the vertex set V consists of the routers in the PD. The edge set E includes all the layer 2 links between PD routers. One of the border routers is chosen as the root of the PD routing graph, and the other border routers are excluded from the graph, to obtain a new graph H. A Shortest Path First (SPF) algorithm such as that disclosed in Dijkstra's *A Note on Two Problems in Connection with Graphs*, Numerische Mathematic, 1, pp. 269-271 (1969), is used to compute a spanning tree T from H.

While aggregation is used in existing networks to reduce the number of entries in forwarding tables, an embodiment of the instant invention utilizes aggregation to subdivide the IP address for purposes of encryption. Each of the edges in the tree T are labeled with routing protocol prefixes that will flow along the corresponding link in the network. FIG. 1 shows an example of such labeling. Given the set of prefixes that flow into a vertex, the vertex can send out the same set of prefixes, plus any prefixes that belong to it.

Alternatively, the vertex v may be able to truncate at least one of the outgoing prefixes. In an exemplary embodiment, a prefix can be truncated if:

(1) the truncated prefix is a prefix (initial substring) of at least two of the original prefixes in the incoming prefix set, and (2) a prefix in an IP address that matches the truncated prefix (some initial substring of the IP address prefix matches the truncated string exactly) does not belong to a router (i.e., another vertex) outside the subtree rooted at the vertex v. In such a case, the two or more matched prefixes in the original set are replaced with the truncated prefix in the set of outgoing advertised prefixes. This truncation is referred to as aggregation. A vertex will be assigned a level key (and is thus a level router) in the tree T if and only if it performs aggregation.

The vertices of the tree are labeled with levels as follows: if a vertex in the tree performs aggregation, and the first aggregating vertex above it on the unique path to the root has level i, then it receives level i−1. This is arranged such that a level router directly above an access router on the longest path from the root to a leaf in the tree is labeled as level 1. (This is arranged by first numbering in the reverse order, with the root having level 1 and increasing the level as they are numbered downwards. When the leaves of the tree are reached, say d levels have been assigned on the longest path from the root to a leaf, then renumbering is begun at the root with level d).

Finally, other border routers are added back into the graph as vertices with level d. Depending on how these other border routers connect to the graph, they may need additional level keys (in addition to the level d keys) and configuration, depending on the relation of the other levels to them. In the best case, they will not require any additional keys or configuration beyond that needed for the original root border router.

A router with a level key is considered to be a level router. Each router R establishes (either through the appropriate key establishment protocol, or through configuration) a shared secret key with its immediate peers. The immediate peers are the ones that are connected via layer 2 links to the router R. Each level router has a copy of the key for that level.

The level routers also have prefix components configured. The prefix Ps consists of prefix components that are obtained from the aggregations that occur between the border routers and the access routers.

Figure 2:
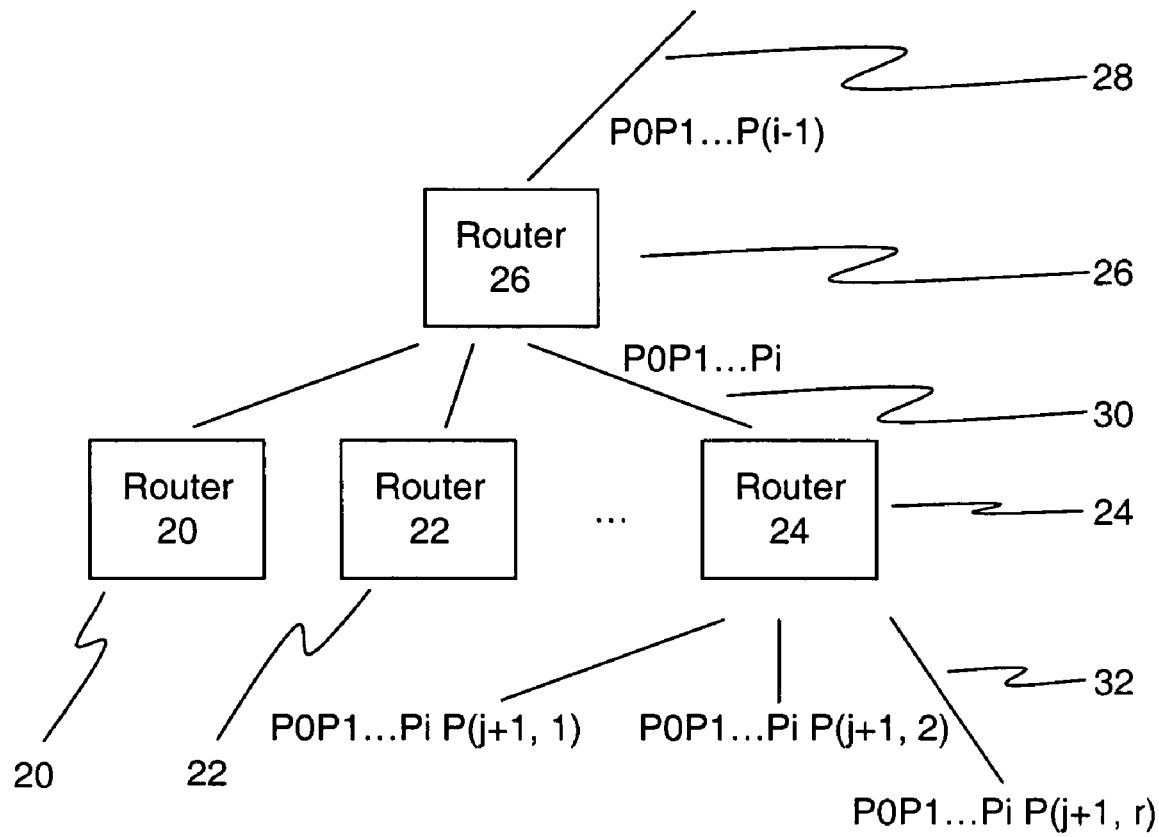
FIG. 2 is an example of obtaining prefix components from aggregation in accordance with an embodiment of the invention.

For example, as shown in FIG. 2, $P_s=P_1,\ldots,P_k$. The routers 24 and 26 are level routers performing aggregation. The lower level routers below 24 are advertising $P_0\,P_1\ldots P_i, P_{(j+1,1)}, P_0\,P_1\ldots P_i\,P_{(j+1,2)}$, and $P_0\,P_1\ldots P_i\,P_{(j+1,r)}$ on links 32 up to router 24. Therefore, router 24 is able to aggregate advertisements into $P_0\,P_1\ldots P$ which are then advertised on link 30 to router 26.

$P_{(j+1,1)},\ldots,P_{(j+1,r)}$ are defined as prefix components. Finally, router 26 also aggregates and advertises $P_0\,P_1\ldots P_{(i-1)}$ upwards on link 28. For example, consider that level router 24 is a target for the prefix $P_1\ldots P_i$, and it can store all of the prefix components $P_{(j+1,1)},\ldots,P_{(j+1,r)}$, where $P_{(j+1,1)},\ldots,P_{(j+1,r)}$ are all the possible prefix components such that $P_0\,P_1\ldots P_i\,P_{(j+1,1)}, P_0\,P_1\ldots P_i\,P_{(j+1,2)}$, and $P_0, P_1\ldots P_i\,P_{(j+1,r)}$ are prefixes. The router must also store the additional prefix components for other prefixes that might be forwarded to it (including due to a router or link failure elsewhere in the privacy domain).

In the following embodiments, a level router does not have to store the actual prefix components, and may instead store less information. The router may store the maximum length corresponding to the longest prefix component that it will decrypt. Accordingly, it follows from the definition of aggregation, since an aggregated route must belong to the subtree of the aggregating vertex, that no prefix component is itself a prefix of another prefix component. Therefore, all prefix components may be identifiable by decrypting the maximum number of bits and matching against a stored list of prefix components.

If all of the prefix components are of the same length, and all possible strings of that length are prefix components, then it is not necessary to actually store the prefix components, but instead, it is adequate to store the length of the prefix components. By storing the length, the router will know how many bits to decrypt.

For instance, let H be a one way hash function. By one way, it is meant that if H(x), but not x, is given for any x in the domain of H, it is difficult to compute x. Concatenation is denoted by either | or comma (,). A routing graph G as described above with d levels is provided, where the d level keys are $K_1,\ldots,K_d$. Key $K_1$ is the key shared by the level d routers, key $K_2$ is shared by the level d−1 routers, . . . , and key $K_d$ is shared by the level 1 routers. (The level d routers are border routers, and the level 1 routers share layer 2 links with access routers.)

Figure 3:
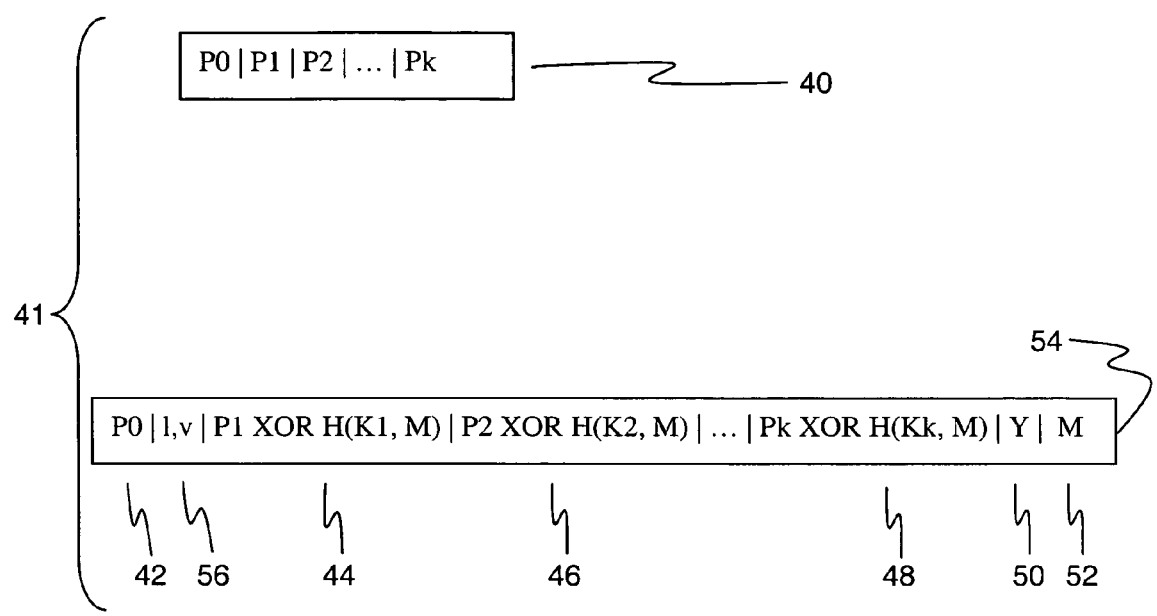
FIG. 3 illustrates construction of CPP Internet Protocol addresses in accordance with an embodiment of the invention (using IPv6 as an example)

FIG. 3 shows the construction of a CPP IP address 54 from the IP address prefix 40, wherein element 41 depicts the conversion of element 40 to element 54. That is, given that the prefix $P=P_0, P_1,\ldots,P_k$, the CPP address keeps the same global routing prefix, $P_0$, 42. Further:

$X_j = \text{Trunc}(H(K_j, M)) \text{ XOR } P_j, 1 \leq j \leq k$, where Trunc(H(Kj, M)) denotes H(Kj, M) truncated to the number of bits contained in $P_j$.

When there is no danger of confusion, we will simply write H(Kj, M) and mean Trunc(H(Kj, M)). In FIG. 3, elements 44, 46, and 48 show X1, X2, and Xk, respectively. The CPP address shown by element 54 in FIG. 3 is then: A=$P_0$, $X_1$, $X_2,\ldots,X_k$, Y, M, where 52 (M) is the suffix of the address, 42 ($P_0$) is the global routing prefix for the PD, and 50 (Y) is a component use to optimize internal routing. (For IPv6, P0 can be obtained such that the first three bits are set to 0, indicating that the boundary between the address prefix and the host identifier does not fall on the 64 bit boundary). (Y is discussed below.)

Two additional bits, 56 (1 and v), are used to indicate whether the address is location privacy protected, and the current key version. Alternatively, it may be possible for routing domains to obtain one $P_0$ corresponding to non-location privacy protected IP addresses, and another $P_0$ corresponding to location privacy protected addresses. In such an alternative case, a separate 1 bit is not needed. For example, if the two $P_0$'s are identical across bits 0-46, and differ only in the rightmost (47th) bit, then a privacy domain router only has to examine bit 47 to identify whether the IP address is location privacy protected.

Using $P_0$ to identify whether the address is location privacy protected allows the full 16 bits of the subnet identifier to be used for subnet identification for non-location privacy IP addresses. Otherwise, with the 1 bit as described above, a non-location privacy IP address only has 15 bits available for subnet identification (unless fewer than 64 bits are used for the host identifier). The key version bit, v, is used to indicate which keys were used to encrypt the CPP IP address.

Figure 4:
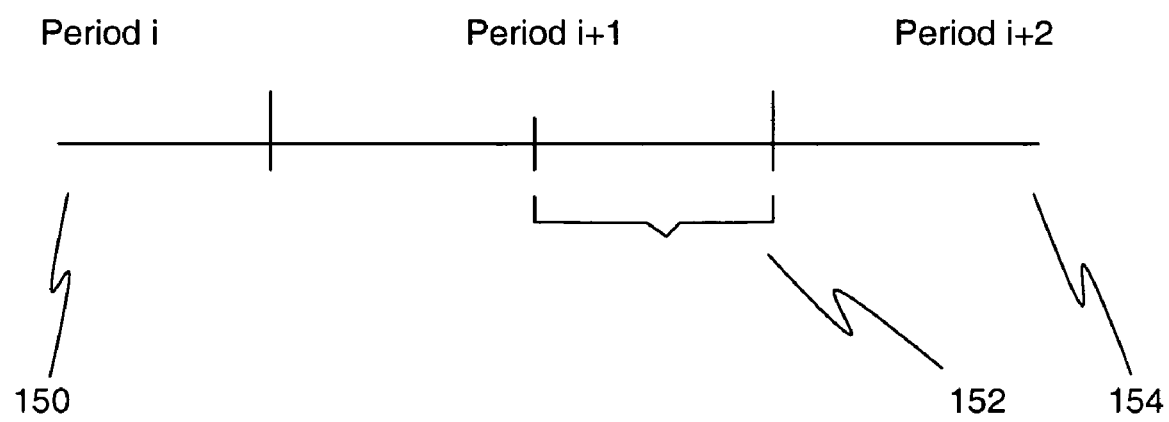
FIG. 4 illustrates an exemplary embodiment of the invention including a bit to indicate the key version and supporting key rollover.

Each router may maintain keys for up to three key periods: the current key period, the previous key period, and optionally, if the router has fetched keys for the next key period, the next key period. FIG. 4 shows the operation of key update and the interaction of address assignment with key update. Element 150 shows the timeline divided into the separate time periods of equal length. One possibility is that each key period will last one day. Other durations, shorter or longer, are possible, depending on security needs and other considerations. Each router must obtain keys for the next key period, 154, before that key period begins. For example, each router may obtain keys for the next key period during the second half of the current key period, 152. Addresses obtained during period i, must expire prior to the start of period i+2 (154). Addresses issued during period i are created using period i keys. Therefore, a router will never encounter a valid address for a period that it does not have keys for.

With the above construction, M should be unique during the lifetime of the level keys. In other words, M should not be reused with the same set of level keys, as part of a different IP address.

Figure 5:
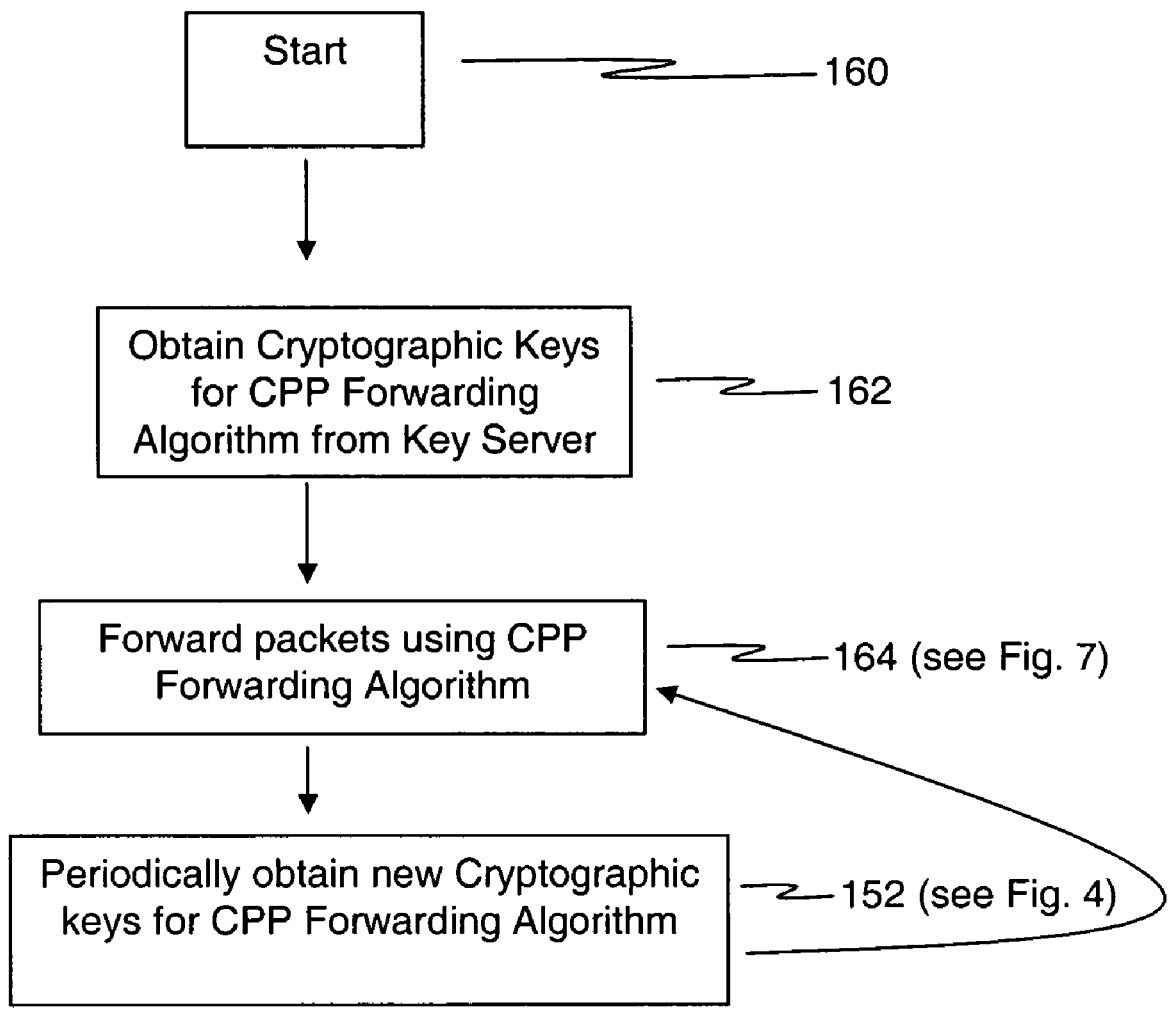
FIG. 5 illustrates an exemplary embodiment of the invention including CPP privacy domain router processing functions.

FIG. 5 illustrates the procedural steps that a CPP-capable privacy domain router (or just a CPP router) follows. The CPP router starts at function 160. In function 162, the CPP router obtains cryptographic keys (from the key server) that allow the CPP router to process CPP privacy protected packets. In function 164, the CPP router forwards CPP packets using the cryptographic keys. (The functions in 164 are further described herein in relation to FIG. 7.) In function 152, the CPP router obtains fresh cryptographic keys from the key server. In function 164 the CPP router continues to forward CPP packets.

In another embodiment utilizing CPP, ISP routers process inbound packets. Suppose a router R1, which is a level (d–j) router, receives a packet with destination IP address: A=$P_0, X_1, X_2, \ldots, X_k, Y, M$.

As shown in FIG. 6, the packet also contains a hop-by-hop option 60 which contains $P_1, \ldots, P_j$, which has been encrypted using the shared secret link key. The packet Type shown in FIG. 6 is to be determined. The Length derives from the length of option (specified, for example, by IPv6). Packet Offset is shown by the bit position to begin the next decryption (this field may be shrunk to 4 bits). The Prefix Length is shown by the number of bits in the Encrypted Prefix (the Encrypted Prefix field is of constant length, to accommodate the longest possible prefix, but not all bits in the field are necessarily part of the Encrypted Prefix being sent; this field may also be shrunk to 4 bits). Accordingly, the Encrypted Prefix: =H(K, M) XOR ($P_1, \ldots, P_j$) where K is the shared secret link key. The Target Level is the next level to be decrypted. If the Target Level is 0, then all levels of prefix have been decrypted.

The shared secret link key is shared between R1 and the previous hop. For instance, let K be the shared secret link key. Then H(K, M) XOR ($P_1, \ldots, P_j$) is contained in the Encrypted Prefix field of the hop-by-hop option.

R1 first checks if the level contained in the Tagt Lv1 field is equal to its level. If not, R1 will obtain the prefix from the hop-by-hop option and use that in the forwarding algorithm. If so, R1, using its level key, decrypts the longest possible prefix, $X_{(j+i)}$. Accordingly, this length is preconfigured as discussed above. R1 obtains $P_{(j+i)}$ from $X_{(j+1)}$: $P_{(j+1)}$= $H_{(K(d-j), M)}$ XOR $X_{(j+1)}$.

R1 starts the decryption at the bit identified by the Offset field in the hop by hop option. After obtaining $P_1 \ldots P_j$ from the hop-by-hop option, R1 then uses the forwarding algorithm with $P_1 \ldots P_j P_{(j+1)}$ as the input prefix. In an exemplary embodiment, after obtaining the next hop identity from the forwarding algorithm, R1 creates a new hop-by-hop option:

(1) $H_{(Kn, M)}$ XOR ($P_1, \ldots, P_j, P_{(j+1)}$), as contained in the Encrypted Prefix field, where $K_n$ is the key that R1 shares with the next hop.

(2) The length of the encrypted prefix is contained in the Prefix Length field. It is note that the actual length of the encrypted prefix field is always 16 bits, but a prefix sent across the link may be shorter. Since it is possible that IPsec AH is being used, the length of the entire option must be kept constant.

(3) The next bit to start decryption is contained in the Offset field.

(4) The current level+1 is contained in the Target Level field.

In essence, each router obtains the prefix information relevant for its level, and uses it to forward the packet. It also includes the prefix information (concatenated with the prefix information from the higher levels) and offset in a hop-by-hop option encrypted in the shared key with the next router on the forwarding path. Therefore, the next router uses the shared key to obtain the prefix part known to the higher-level routers, and uses its level key to obtain the prefix part corresponding to its level. The concatenation of these two prefix parts is what the next router uses in its longest match forwarding algorithm.

The third highest bit in the option type is 1, since the option data may change en-route. If IPsec AH is used, then IPv6 requires that the hop-by-hop option be included in the calculation except the bits are zeroed out. Therefore, the size of this option is fixed, regardless of the size of the prefix (16 bits may be used for the Encrypted Prefix field).

CPP does not require overhead IP tunneling as do addressing schemes such as Mobile IP and HMIPv6. Therefore, 40 bytes associated with the extra IP header (such as when using Mobile IP and HMIPv6) are saved.

The present invention's forwarding algorithm is discussed below. Let FWalg( ) denote the existing longest prefix match forwarding algorithm. A match of an initial substring of IP address prefixes is made against forwarding table entries (the rest of the IP address prefix is encrypted). Therefore, there may be several matches, and the algorithm accordingly needs modified slightly.

Let FWalg*( ) denote the longest prefix matching algorithm, except that the initial substring prefix S from the packet is not allowed to match a prefix with more prefix components. In other words, S can successfully match either prefixes that have the same number of components as S, or fewer than S. Let S=P0, ..., P(i−1), Pi, where the Pi are prefix components. Then S matches (in order of best-to-worst match):

S
$P_0, \ldots, P_{(i-1)}$
$P_0, \ldots, P_{(i-2)}$
$P_0, \ldots, P_{(i-3)}$
. . .
$P_0$
$P_0, \ldots, P_{(i-1)}, Q1$
$P_0, \ldots, P_{(i-1)}, Q2$
. . .
$P_0, \ldots, P_{(i-1)}, Qk$
$P_0, \ldots, P_{(i-2)}, Q1$
$P_0, \ldots, P_{(i-2)}, Q2$
. . .
$P_0, \ldots, P_{(i-2)}, Qk$
. . .

where $|Q1|<=|Q2|<= \ldots <=|Qk|$ and the Qi are prefix components. Also, the $P_0, \ldots, Q_i$ are all owned by level routers.

Furthermore, an exact match is required (the matched prefix must be equal to the input prefix) for a local interface. So if S is longer than a local interface prefix in a forwarding table, it cannot match the prefix. A packet is also not forwarded out the interface from which it arrived, unless a decryption has occurred. A motivation for not allowing matches against longer prefixes follows the thought that longer prefixes correspond to level routers lower in the tree that cannot decrypt the next prefix component. Therefore, it does not help to forward the packet to a lower level router before the next prefix component is decrypted.

Figure 7:
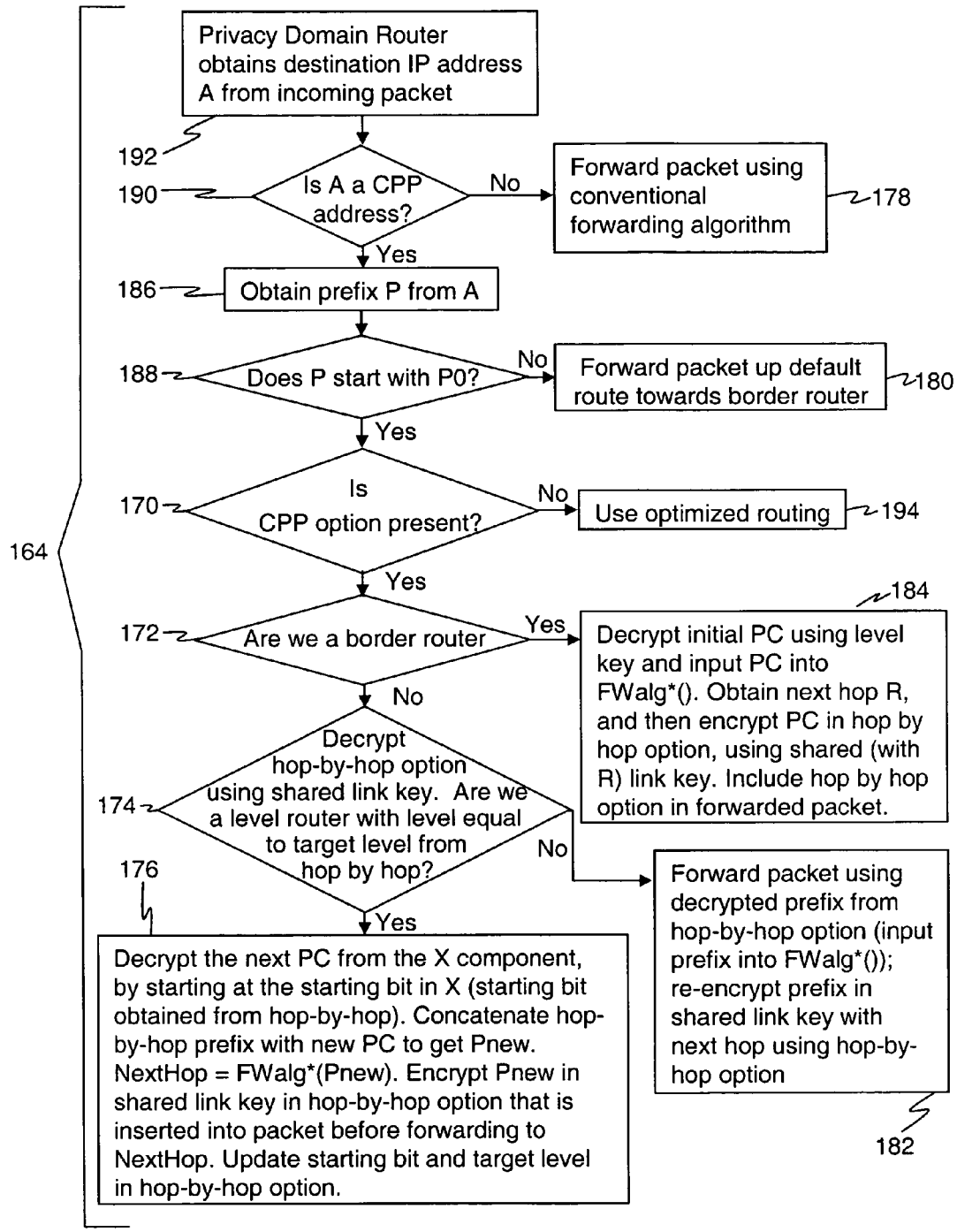
FIG. 7 illustrates an exemplary embodiment of the invention including a CPP forwarding algorithm.

FIG. 7 illustrates an embodiment of the invention by which routers forward packets, using a modified (CPP) forwarding algorithm. It is noted that FWalg*( )=FWalg( ) in the case where the prefix is completely decrypted. As shown in FIG. 7:

```
decrypt(Prefix, starting_bit, target_level)
{
if (hop-by-hop option present AND (hop-by-hop option type == CPP))
decrypt hop-by-hop option to get the hop-by-hop prefix Q, target level, starting bit for
decryption; // Figure 7: function 174
if (we have a level AND target_level == our level) // Figure 7: function 176
K = our level key;
S = H(K,M) XOR [starting bit in Prefix up to maximum length for prefix
component];
search S for the correct prefix component C (match against stored prefix
components);
update starting_bit, target_level;
return (Q appended with C);
else // Figure 7: function 182
return (Q);
else if (our level == d) // we are a border router. // Figure 7: function 184
K = our level key;
S = H(K,M) XOR [starting bit in Prefix up to maximum length for prefix component];
search S for the correct prefix component C (match against stored prefix
components);
update starting_bit, target_level;
return (C);
else
return error; // we shouldn't be here
}
CPP_inbound_route (Packet)
{
obtain prefix P from Packet;
P_new = decrypt(P, &starting_bit, &target_level); // Figure 7: function 174
interface = FWalg*(P_new);
if (interface == NULL) // no match
discard P;
else // Figure 7: functions 176, 182
create a new hop-by-hop option for P with P_new, starting_bit, target_level,
encrypt
with shared link key;
forward Packet out interface;
}
main( )
{
while (1)
{
obtain destination IP address A for incoming Packet; // Figure 7: function 192
if (IP address A is not location privacy protected) // Figure 7: function 178
FWalg( );
else
{
obtain prefix P from A; // Figure 7: function 186
if (P does not start with P0) // Figure 7: function 188
forward Packet up the default route; // Figure 7: function 180
else if ((P starts with P0) && (hop-by-hop option not present || types of hop-by-hop
options !=
CPP) && (we are not a border router) ) // Figure 7: function 170
optimal_route(Packet); // described in optimal routing section below, Figure
7: function 194
else
```

```
CPP_inbound_route (Packet);
    }
  }
}
```

An example of a CPP forwarding algorithm is depicted by element 164 in FIG. 7. As shown in function 192 of FIG. 7, a Privacy Domain Router obtains the desitnation IP address, A, from an incoming packet. In function 190, the address, A, is evaluated to determined if it is a CPP address. If it is not, function 178 is followed and the packet is forwarded using a conventional forwarding algorithm. If the address, A, is a CPP address, then function 186 obtains prefix P from A. Then, in function 188, it is determined if the prefix P starts with $P_0$. If prefix P does not start with P0, the packet is forwarded in function 180 up the default route towards a border router. If the prefix P does start with $P_0$, then the function of 170 is determined.

In function 170, it is determined if a CPP option is present. If not, function 194 requires that optimized routing be utilized. If a CPP option is present, function 172 inquires if the packet is currently at a border router. If yes, then function 184 decrypts an initial PC using a level key and inputs the PC into FWalg*( ), followed by obtainment of the next hop R, and encryption of the PC in a hop-by-hop option using shared secret (with R) link key. The hop-by-hop option is then forwarded in the packet.

If a CPP option is not present in function 172, function 174 decrypts the hop-by-hop option using a shared link key, and then asks if the packet is at a level router with a level equal to the target level from the hop-by-hop. If yes, function 176 decrypts the next PC from the X component of the address, by starting at the starting bit in X (this starting bit is obtained from the hop-by-hop option). Function 176 then concatenates the hop-by-hop option prefix with a new PC to get Pnew (NextHop=FWalg*(Pnew)). Function 176 then encrypts Pnew with a shared link key in a hop-by-hop option that is inserted into the packet before forwarding to the next hop. Lastly, function 176 updates the starting bit and target level in the hop-by-hop option.

If the determination of function 174 indicates that the packet is not at a level router with an level equal to the target level from the hop-by-hop, function 182 is employed. Function 182 forwards the packet using a decrypted prefix from the hop-by-hop option (input prefix into FWalg*( )), and then re-encrypts the prefix using a shared link key with the next hop using the hop-by-hop option.

A further embodiment of the present invention provides for forwarding algorithm resilience in the presence of failures. That is, when routing links fail, there is the possibility of changes in the ways prefixes are aggregated. Therefore, lower level routers are not allowed to aggregate routers of the same or a higher level. A motivation for this requirement is to allow routers of higher levels to be visible in the forwarding table of other routers, in case a decryption of a particular level prefix component is needed. For the proof below, non-level routers do not perform aggregation, even when routing links fail.

Figure 8:
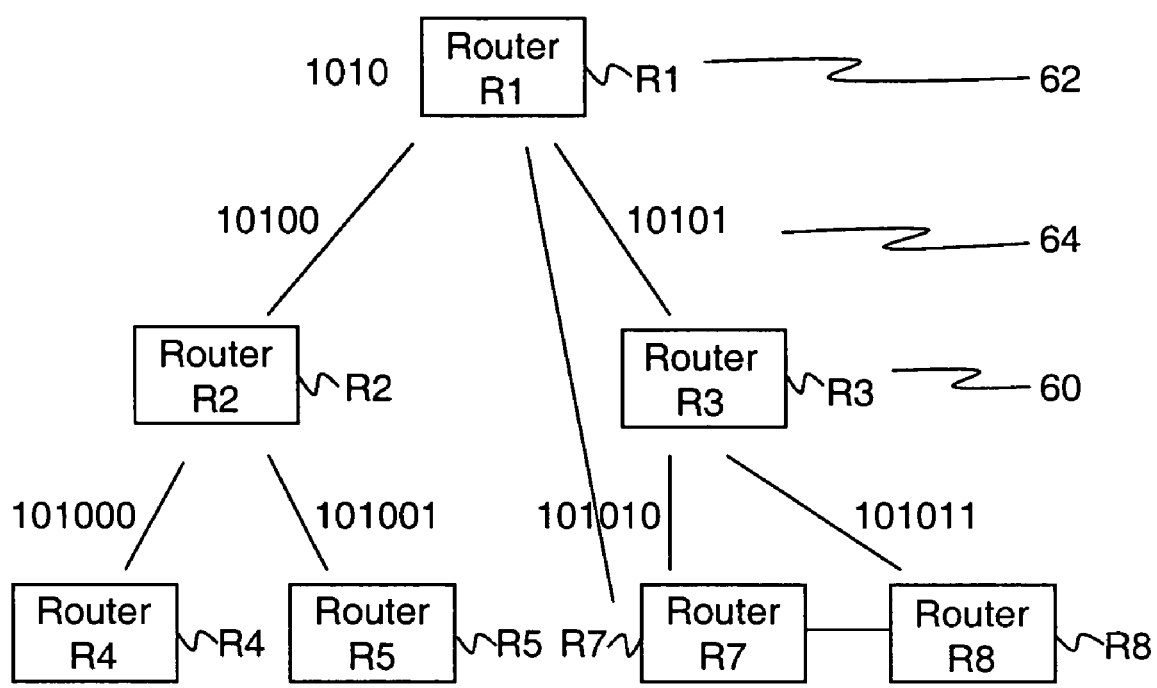
FIG. 8 illustrates an exemplary embodiment of the invention including a CPP forwarding algorithm in view of a routing failure.

FIG. 8 illustrates an example of a CPP access network where the IP address prefixes have 6 bits (of which 2 bits are used for the subnet identifier), and the forwarding algorithm is able to successfully route packets to their destination, including when there are a moderate number of failures. Each link is labeled with the prefix that is advertised by the lower router on that link. For example, router R3 (element 60) advertises the prefix 64 (10101) upwards to 62 (router R1). In FIG. 8, it is supposed that R3 fails. Then further consider a packet with prefix 101010. R1 decrypts the first bit and obtains 10101. When R3 fails, R1's forwarding table becomes:

10100 R2
101010 R7
101011 R7
1010 local 10101 cannot match 101010 or 101011 because these prefixes are longer than 10101. (If such a match was allowed, then the packet would be sent to a lower level router in the graph that cannot decrypt the next bit. Therefore we do not allow such a match in the forwarding algorithm.)

Instead, 10101 matches 10100 (when the last zero is removed). The packet is forwarded to router R2 which then decrypts and obtains the prefix 101010. This prefix then matches itself in R2's forwarding table:

10100 local
101010 R1
101011 R1
1010 R1
101000 R4
101001 R5

So the packet is then forwarded to R1. R1 then matches the prefix against R7 and forwards it to R7. R7 will forward the packet on the local interface and the packet is thus delivered, despite the failure of router R3.

The present invention also provides for forwarding algorithm robustness, as proven by the following proposition (Lemma 4.1) under certain conditions. Suppose a packet P arrives in the privacy domain via either a border router or an access router (the entry point router). Suppose also that if the packet P passes through a level (i+1) router Q and the next level router R that should handle the packet is down (it is not in the same connected component as Q), then R has a sibling router in the same connected component as Q, where sibling is defined as another router with level i that is also a descendant of Q. Then the packet will be completely decrypted (all level keys will be applied and the entire prefix will become available to the routers) during the forwarding process.

As proof, suppose the packet P arrives at a border router. Using induction, suppose prefix components $P_1, \ldots, P_i$ have been decrypted. It is shown that P will be forwarded to a level (d−i) router. Let $R_i$ be the level (d−i+1) router that decrypted $P_i$. Choose R, in the original spanning tree that is the router which owns prefix $P_1 \ldots P_i$. Then R has level (d−i).

Case a: R is up, and in the same connected component as $R_i$. If there is a path from $R_i$ to R, where aggregation does not occur, then choose the minimal cost path and call it A. Then $P_1 \ldots P_i$ will be an exact match in the forwarding algorithm for each router along the path. So P will be forwarded to R as desired.

Otherwise, pick a path A with minimal aggregation and cost, from $R_i$ to R. In the path from $R_i$ to R, let $T_1, \ldots, T_k$ be the aggregating routers. Then the prefix advertised by $T_j$ will be successfully matched in the forwarding algorithm for $T_{(i-1)}$, where $T_0 = R_i$. This last statement follows from the fact that we chose a path with minimal aggregation. So P gets forwarded to R as desired.

Case b: R is in a different connected component. By hypothesis, $R_i$ is in the same connected component with a router T that has the same level as R. So T advertises $P_1 \ldots P_{(i-1)}$, Q. Either $P_1 \ldots P_{(i-1)}$, Q is visible to $R_i$ (in $R_i$'s forwarding table), or an aggregated prefix $P_1 \ldots P_j$ is visible. In the first case, if no aggregated prefix is visible, then $P_1 \ldots P_{(i-1)}$, Q is the match. Such matching would then continue in the chain of routers between $R_i$ and T, resulting in the packet P being forwarded to T. T then decrypts the packet as desired.

Now suppose that an aggregated prefix $(P_1 \ldots P_j)$ is visible to $R_i$. This best match will be followed until either a decryption occurs (and the proof is complete), or a longer prefix component sequence is encountered: $P_1 \ldots P_k$ where $k > j$. Once again the best match will be followed until either a decryption occurs (and the proof is complete), or a longer prefix component sequence is encountered. Finally, the following must be encountered: $P_1 \ldots P_{(i-1)}, Q_1$, for some prefix component $Q_1$. The best match for the previous is followed until router that owns this prefix is arrived at which is a level router by the statement of the forwarding algorithm above (this router is a sibling router which has the proper level key). So the next component gets decrypted and the proof is complete.

Further, suppose a packet arrives in the privacy domain via either a border router or an access router (the entry point router), and suppose the conditions of Lemma 4.1 (described above) hold. Then the packet will be delivered to the destination access router. As proof, consider that Lemma 4.1 and the properties of the existing longest prefix match routing algorithm (FWalg*( )=Fwalg( ) once the prefix is completely decrypted).

In a further embodiment, it is possible to relax one of the requirements for aggregation and thereby allow additional aggregations, in a process herein called normalization. The advantages of additional aggregations include increased privacy, and a further reduction in the number of entries in the router forwarding tables. In this embodiment, the requirement of prefix ownership is relaxed (where the owning router is the aggregating router for the prefix, or the router that has an IP address equal to the prefix). That is, a router in the aggregating router's subtree is not required to possess ownership of the prefix. Thus, an aggregated prefix may contain a route that is advertised across a link not in the spanning tree T; instead, the link may be contained in the routing graph G.

Figure 9:
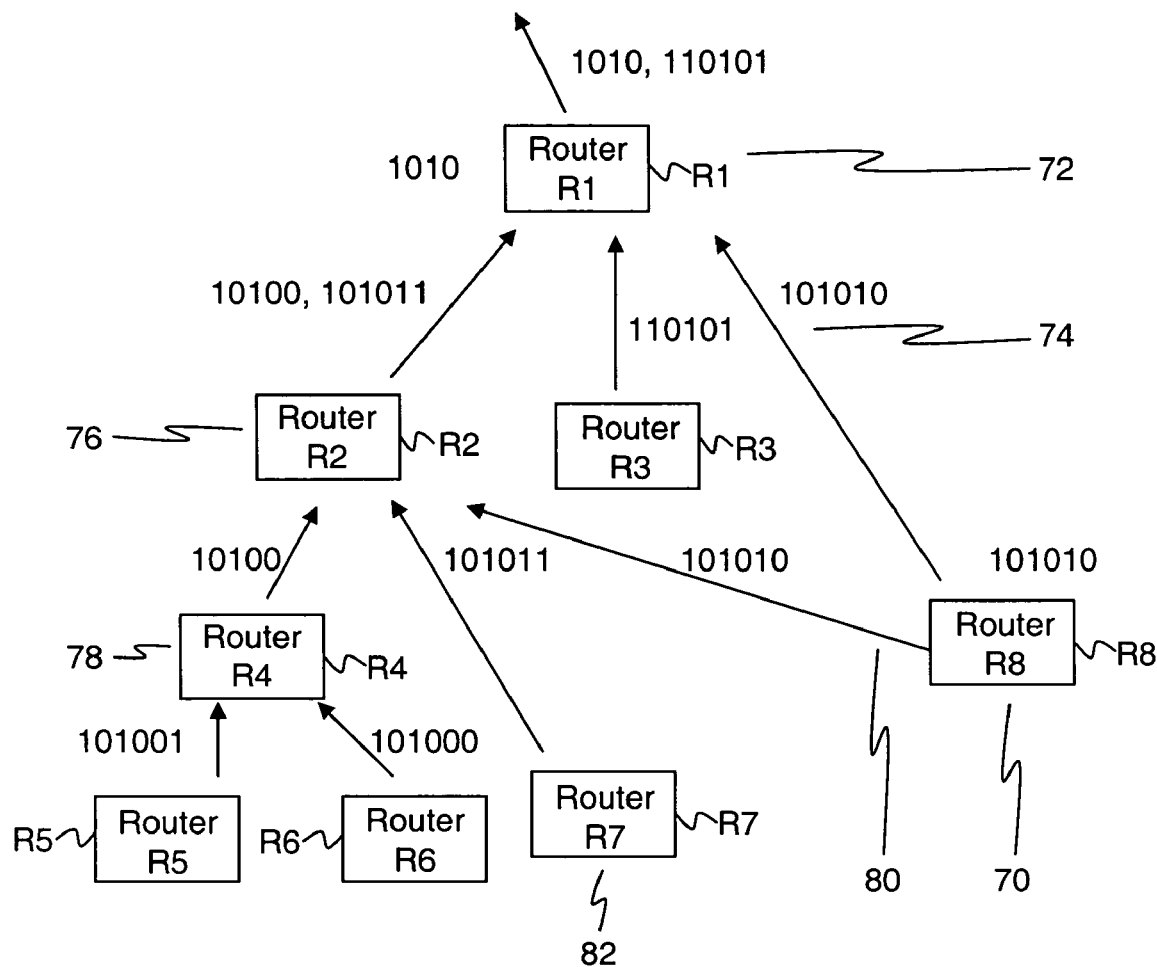
FIG. 9 illustrates an exemplary embodiment of the invention including an example of normalization.

FIG. 9 illustrates an example of normalization, showing part of a privacy domain routing graph G. This example once again uses a limited number of bits in the prefix. However, note that link 80 is a link not in the original spanning tree, T. Therefore, if element 76 (router R2) accepts the link 80, strict aggregation as previously explained is not followed. That is, if router R2 only receives advertisements for prefixes 10100 and 101011 for aggregation, such would be normal aggregation. However, since 101010 is outside the subtree rooted at router R2, it follows that router R2 does not follow the normal rules of aggregation because of acceptance of the link 101010 from router R8.

By relaxing the aggregation requirement, router R2 is allowed to aggregate prefixes 10100 and 101011 (along with 101010 advertised on 80) to 1010 in router R1. Therefore, element 72 (router R1) will have one less entry in its forwarding table. From a privacy perspective, R1 will no longer be able to detect whether a packet is bound for 82 (router R7). Accordingly, privacy is increased when allowing router R2 (element 76) to normalize prefixes 10100 and 101011 (along with 10101 advertised on element 80) to 1010.

The inventors have noted that there may be a problem with allowing router R2 to normalize and advertise to 1010, however. Element 70 advertises 101010 on link 74 upwards to 72 (router R1). Element 72 may not be able to detect whether 1010 is the intended prefix, or whether a decryption of two additional bits that results in 101010 is the intended prefix. That is, an intended prefix may be 101011 or it may be 101010. A decryption result of 101010 may be 101011 with the last two bits encrypted under router R2's key. This problem may be solved by encoding 1010 as 10100. Accordingly, with this encoding, router R1 will decrypt two additional bits (it receives 1010 in the hop-by-hop option).

The bit pattern router R1 thus obtains from the decryption is either 0x or 10, where x can be either 0 or 1. In the first case (x=0), a packet will be forwarded to element 76 (router R2), with a hop-by-hop option containing 1010 as the prefix. Note that the encoded prefix (10100) is not sent, rather the actual prefix 1010, which corresponds to the forwarding table prefix, is sent. Accordingly, 10100 gets mapped to 1010. In the second case (x=1), a packet will be forwarded to element 70 (router R8) with a hop-by-hop prefix of 101010.

Before aggregation, element 76 (router R2) is a router without a level, and element 72 (router R1) is a level 2 router. After element 76 is allowed to aggregate, it becomes a level 2 router, and element 72 becomes a level 3 router. All the routers above 72 increase their level by 1. Element 78 (router R4) has level 1 both before and after aggregation. With the encoding of prefix components (PCs), two distinct sets of PCs are introduced. A first set is the actual PCs that are part of the prefixes in the forwarding table. A second set is the set that are encrypted in the CPP address. The the first set at C_R, and second set is set at N_R, and this encoding technique is called normalization.

When additional aggregation is introduced, by relaxing the aggregation restriction with respect to only aggregating routes within the spanning tree subtree rooted at the aggregating vertex, levels are effected within the routing graph G. Suppose a router R that was not a level router, now becomes one. The routers within the subtree rooted at R will keep the same level. R will have a level that is one greater than its children (in the spanning tree). The other level routers in the graph G all have their level increased by 1. Of course it is noted that if the aggregating vertex was already a level router, then none of the router levels are changed.

Normalized sets of PCs are required to be encoded in a prefix for each router. With a normalized set of PCs, no PC can be a prefix of another PC. Therefore, there is no ambiguity when decrypting a PC. After decrypting a normalized PC, the normalized PC (belonging to the set N_R), can be mapped to a PC in the original set of PCs for the router R, C_R.

Let C_R be the set of PCs at a router R. Suppose the prefix that identifies the subnetwork for the user host is P. P can be written as follows:

$P = P_1 | P_2 | P_3 | \ldots | P_k$, where | denotes concatenation,
and $P_1 | P_2 | \ldots | P_i$ is the matching prefix for the d-ith level router. Let the key for the d-ith level be denoted by $K_i$.

A set of possible $P_i$'s at a router R is C_R. For such, a normalized version of C_R is required. N_R is a set satisfying the properties of Definition 6.2, shown below.

Definition 6.1: If string S is a prefix of string T, then (S,T) is a prefix pair.

Definition 6.2: N_R is a set and a bijection f (a bijection is a function that is both one-to-one and onto) satisfying the following properties:

The bijection f: N_R -> C_R.

For any two strings S, T, which are members of N_R, then S is not a prefix of T.

If C_R has no strings S, T such that S is a prefix of T, then N_R=C_R. Otherwise consider a string S in C_R, which is a prefix of some string T, where T is the shortest of all strings in C_R that S is a prefix of.

The set E={SR: where R is a string and |SR|=|T|} is not contained in C_R. Otherwise the longest prefix match routing algorithm would never select the string S. We select Y not in E such that |SY|=|T|. We remove S from the set C_R and add in SY to get the new set N1_R.

Accordingly, a first proposition states that N1_R contains strictly fewer prefix pairs than C_R. A second proposition states that the mapping f1: N1_R->C_R that is the identity on N1_R except for mapping SY to S, is a bijection. The second proposition is obvious. The first proposition follows since SY is a prefix of strictly fewer strings than S (SY is not a prefix of T). Also, any string that is a prefix of SY is either S, a prefix of S, or has length greater than S but less than Y. The last case is not possible since T was the shortest string that S is a prefix of. The first case is not possible either, since S is not in N1_R.

The previous construction is continued (which must eventually terminate since each newly created set has fewer prefix pairs than the previous one). Accordingly, C_R->N1_R-> . . . ->Nk_R=N_R is obtained, and, thus, N_R is the desired set, with a bijection from N_R to C_R.

N_R provides a compact encoding of the encrypted prefix components. In particular, each router can decrypt the longest possible prefix and then search for a match without concern for any ambiguities. The set N_R is used in the prefix component encoding. The router maps a string in N_R to a string in C_R to obtain the appropriate matching string for the forwarding algorithm (so the forwarding table entries are unaffected by such mapping and encoding). It is noted, however, that the prefix component encoding may be a little larger than the actual prefix. The degree of size increase can be minimized or eliminated if the routing topology and prefixes are set up to maximize the amount of aggregation.

A further embodiment of the present invention provides optimized routing. When a packet is sent from a host attached to an access router to another host attached to a different access router within the privacy domain, then the optimal forwarding path will often not require the packet to traverse through a border router. One performance metric for CPP is to what extent optimal forwarding paths, present when CPP is not used, are still used with CPP. With the above described algorithms, an internally bound packet would always traverse through one of the border routers.

In the present invention, it is desirable to (1) reduce the traffic load on border routers, and (2) reduce the number of routers traversed by a packet with a CPP protected destination address. Recall that the location privacy protected IP address is $A=(P_0, Y, X, M)$, where Y is available for optimizing intra-domain communications. Y is expected to be approximately 16-36 bits. ($P_0$ is either 32 or 48 bits, and X is roughly 16 bits. Note that X can be a little longer than 16 bits if normalization occurs. Y can also be a little longer in the presence of multiple routes up the tree. Therefore, M is roughly 18-24 bits.)

Examples for optimized routing in accordance with various embodiments of the present invention include a basic example, an enhanced basic example, an optimized example, a special subcase of an optimized example, and a keyed hash variant of an optimized example. These are discussed below.

In the basic example, Y consists of the IP address prefix encrypted in the shared key between the access router for the host and its parent router. Here the access router will perform ingress filtering (by decrypting and inspecting the source address prefix as usual). The parent router will also check the destination address by decrypting it and checking if it should route the address to one of its child access routers, providing limited optimized routing (for hosts whose access routers share a common parent router).

In the enhanced basic example, Y consists of the IP address prefix encrypted in the key shared between the router that is two levels above the access router, and its children. Here the parent of the access router will perform ingress filtering, either using the access router's filter directly, or using an aggregated filter (which will be less granular). Both of these routers can optimize routing within their subtree. There is less security with the enhanced basic example, since a compromise of either a parent or a grandparent will result in the potential loss of location privacy for all the hosts below the grandparent.

An advantage of the basic and enhanced basic examples is that the two are fairly simple to implement as Y only requires 16 bits. Additionally, the fully optimized routing examples further explained below require larger decryption operations.

A potential problem noted by the inventors with the basic and enhanced basic examples is that a packet can be misrouted if the wrong encryption key is used and the decrypted prefix accidentally matches a prefix in the forwarding table. While such a probability is dependent on the number of prefixes in the forwarding table, the prefix is only 16 bits, and therefore this probability may be too high for some networks.

Figure 10:
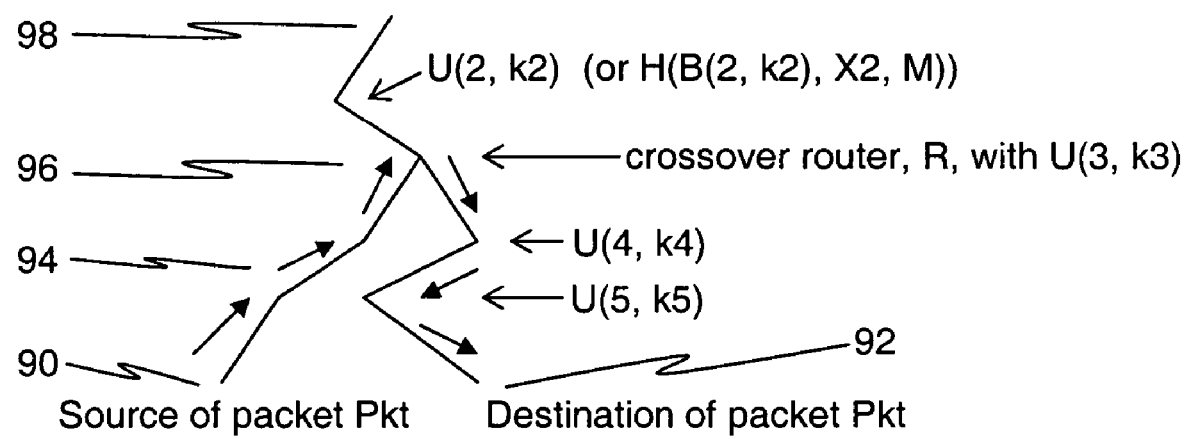
FIG. 10 illustrates an exemplary embodiment of the invention including an optimized routing scheme.

FIG. 10 illustrates an optimized routing example. In this embodiment, a packet sent from an internal host is forwarded up the routing graph until it reaches a router that is part of the optimal path for the destination address. This router is called the crossover router. The packet should be routed downwards at this point. The crossover router R will identify that it is the crossover router for this packet by performing the standard XOR (using its level key as described above) with a segment of the Y component (actually $W(j,k)=U(j,k)$ XOR $H(Nj, M, Xj)$), to obtain a local secret, $U(j, k)$. If the result is a match with the secret, then R knows it is the crossover router.

The crossover router, R, then decrypts the initial portion of Z (where Y=(W,Z)) to obtain the initial prefix portion. R then forwards the packet using the algorithm described for inbound forwarding. FIG. 10 also shows the optimal forwarding path for a packet Pkt sent by a host attached to 90 within the privacy routing domain to another host attached to 92 within the same domain. The packet Pkt is forwarded up the default route (towards the border routers 98) by several routers including 94. Router 96 determines that Pkt is destined for a host in a subtree below itself by examining W(3, k3), U(3, k3) and then forwards Pkt to the router with secret U(4, k4). Thus, 96 is the crossover router for the packet, Pkt. Pkt is then forwarded down the tree by the successive routers until it reaches 92.

As a further optimization (at the cost of reduced security), the crossover secrets can be shared with a few other routers at the same level over shared links (crosslinks in the router graph). This sharing will allow these neighbor routers to forward the packet immediately to the crossover router.

Figure 11:
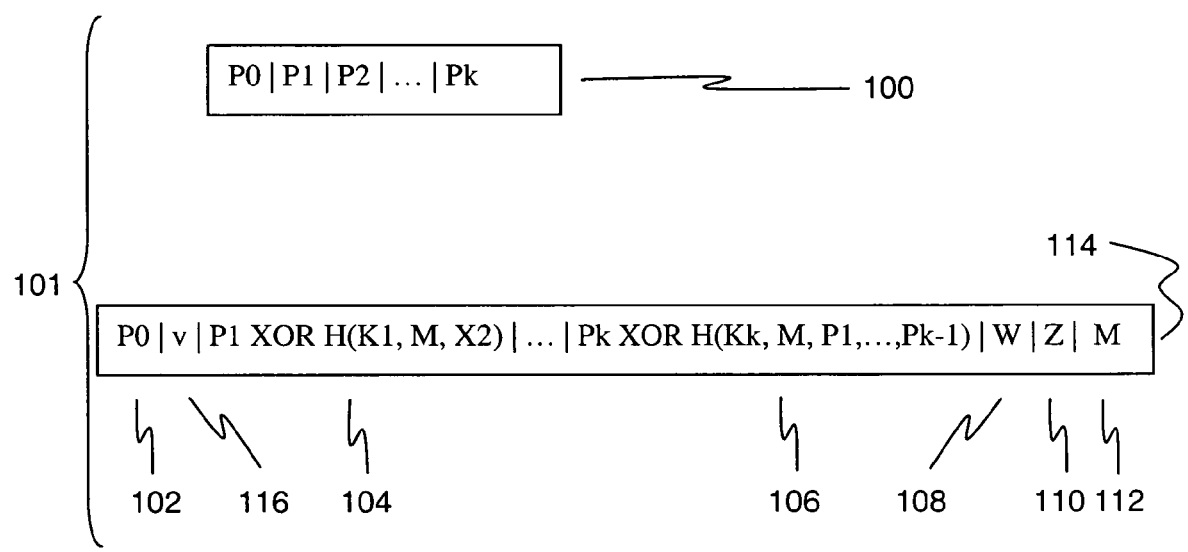
FIG. 11 illustrates an exemplary embodiment of the invention including a CPP extended address in a subnet being identified by a prefix (using IPv6 in an exemplary form)

As discussed above, the components of the CPP address for optimized routing place additional requirements on the available bits in the IP address. FIG. 11 illustrates exemplary IP addressing, including possible requirements placed on available bits.

Consider that it is desirable to reduce the number of bits needed for M. The following example will only require M to be unique within a given subnet. In other words, two CPP IP addresses with the same prefix must have different values for M, but otherwise, they can have the same value for M. This following algorithm is thus expected to reduce the size of M to about 16-22 bits.

Given an IP address with prefix components $P_0, P_1, \ldots, P_k$ as above, then the extended CPP IP address is
$P_0, v, X_1, X_2, \ldots, X_k, Y, M$
where:
$X_k = H(K_k, M, P_1, \ldots, P_{(k-1)})$ XOR $P_k$,
$X_{(k-1)} = H_{(K(k-1), M, Xk)}$ XOR $P_{(k-1)}$,
...
$X_1 = H_{(K1, M, X2)}$ XOR $P_1$.

FIG. 11 depicts with element 101 the construction of a CPP address 114 from an IPv6 Address Prefix 100. In FIG. 11, $Z = P_1$ XOR $H_{(T, M, X1)} | P_2$ XOR $H_{(T3, M, X2)} | \ldots | P_k-1$ XOR $H_{(Tk, M, Xk-1)}$, where $Ti = HMAC(L_i, L_1|L_2| \ldots |L_{(i-1)})$, $1 <= i <= k$, and $L_1$ is the key distributed by the border router, $L_2$ is distributed by the next hop router, etc. Further, $W = H_{(B(1,k1)}$, $X_1, M)$ XOR V1, $H_{(B(2,k2)}, X_2, M)$ XOR $V_2, \ldots, H_{(B(j,kj)}, Xj, M)$ XOR $V_j$ (for the keyed hash variant of the fully optimized scheme), and where $V_1 = H_{(N1, M, X1)}, \ldots V_{(k-1)} = H_{(N(k-1), M, Xk-1)}, V_k = H_{(Nk, M, Xk)}$, (or $W = U_{(1,k1)}$ XOR $V_1$, $U_{(2,k2)}$ XOR $V_2, \ldots,$ U(j, kj) XOR $V_j$ (for the fully optimized scheme).

In FIG. 11, element 100 shows the true, or unencrypted, IPv6 address. The global routing prefix is 102. Elements 104 and 106 show $X_1$ and $X_k$. The above expression for $X_i$ forces hosts with different prefixes P to not have correlated X's, even when they share the same M value in their CPP address.

Let $N_1, \ldots, N_d$ be a second set of level keys. These are pair-wise distinct secret keys. All the routers belonging to that level share each level key. The following hash expressions are abbreviated as follows:
$V_1 = H(N1, M, X1)$,
...
$V_{(k-1)} = H_{(N(k-1), M, Xk-1)}$,
$V_k = H_{(Nk, M, Xk)}$, The level d+1−j routers are numbered starting at 1. The crossover secret, $U_{(j,k)}$, is a secret known only to the kth router at level d+1−j, and the key server. Since the $U_{(j,k)}$ (at level j) are all pair-wise distinct, it follows that the number of bits needed is equal to the base 2 logarithm of the number of level d+1−j routers. Beginning with levels immediately above the access routers, the necessary number of bits are reserved. The total number of bits needed for the U(j,k) is equal to the sum of the base 2 logarithms of the number of level d+1−j routers, over j. Typically, the largest number of routers would be at levels immediately above the access router level.

Suppose the optimal path for a packet P from the Internet includes level routers with the following secrets: $U_{(1,k1)}$, $U_{(2,k2)}, \ldots, U_{(j,kj)}$. Then the W component of the IP address contains $W_{(i,k)} = U_{(i,k)}$ XOR $V_i$ where M is the suffix as above, $V_i$ is the key defined above, and the optimal path includes the k(th) router at level d+1−j. The IP address is:
$A = (P_0, X, Y, M)$ where $P_0$, X, and M are as described above, $Y = (W, Z)$
$W = U_{(1,k1)}$ XOR $V_1$, $U_{(2,k2)}$ XOR $V_2, \ldots, U_{(j,kj)}$ XOR $V_j$ Element 108 in FIG. 11 shows W. The key version bit v is shown as element 116. (The 1 bit is not shown, since that may not be necessary, e.g., in the case where the routing domain has obtained separate global routing identifiers for the location privacy protected addresses and the non-location privacy protected addresses). The kth router at level d+1−j is the one that the packet with destination address equal to the IP address A would normally traverse. (Of course, it may not, which could affect the optimization in this case.)

FIG. 11 further illustrates the extended CPP IP address. In the above expression for W, the number of level routers between the border router and the host's first hop router is visible. (Each level's crossover secret has a fixed length, dependent on that level.) If all the paths from border routers to access routers in the spanning tree are of equal length, then this is not a problem. Otherwise, it may be desirable to use additional crossover secrets, not corresponding to any router, for the lower levels. By adding these into the expression for W, information leakage is eliminated as follows:
$V1 = H_{(N1, M, X1)}$,
...
$V_{(k-1)} = H_{(N(k-1), M, Xk-1)}$,
$V_k = H_{(Nk, M, Xk)}$,
$V_{(k+1)} = H_{(N(k+1), M, X1)}$,
$V_d = H_{(Nd, M, X(d\ mod\ k))}$.
$W = U_{(1,k1)}$ XOR $V1$, $U_{(2,k2)}$ XOR $V_2, \ldots, U_{(d,kd)}$ XOR $V_d$ All level routers are configured with the lengths of the crossover secrets for all levels. There is exactly one length for each level. Alternatively, if the U's are only used to optimize routing for a few levels in the routing graph, then there may be no need for adding in the extra W(j,k)'s corresponding to the extra secrets. In one embodiment, extra W(j,k)'s are added so that the resulting tree is completely balanced: all paths from the border router root to access routers have the same length (for the spanning tree modeled by the W(j,k)'s). With this approach, it is also straightforward for a router to find the W(j,k) component corresponding to its level: it will always appear in the same position in the W component.

Recall that the Y component of the IP address in the instant invention may include a Z component. A description of an embodiment with the Z component follows. (Z is illustrated as element 110 in FIG. 11.) Each level router shares a secret key L with all the routers in the subtree below it where the subtree is rooted at the router on the shared link. In the original spanning tree, a level router has a set of child routers. The level router shares a separate secret key with each of the subtrees rooted at the respective child routers. The component Z is 14-16 bits, and consists of the subnet prefix divided into the prefix components as described above, where each component is encrypted with a secret key T.

Each secret key T is obtained from the secret keys L from the existing level router and the level routers above it. Therefore, a given level router R can obtain the prefixes from the level routers above it by decrypting the prefix components in Z corresponding to the higher levels, and each level router has all the keys L from the levels directly above itself. But this is only possible if R is on the optimal path for the packet, thus maintaining security. (It is noted that the Z component may leak information about IP address locations to some of the other routers in the tree.)

The prefix component Pi is encrypted using the key
$T_i = HMAC(L_i, L_1|L_2| \ldots |L_{(i-1)}): Z_i = P_i$ XOR $H(T_{(i+1)}, M, X_i)$, $2 <= i <= k$, where
$L_1$ is the key distributed by the border router, L2 is distributed by the next hop router, etc. In the above HMAC expression, Li used as the HMAC secret key, and $L_1|L_2| \ldots |L_{(i-1)}$ is the "text".

Other constructions are possible for $K_i$. The TLS RFC and various cryptographic papers describe methods for combining several keys into one key. $Z = P_1$ XOR $H(T_2, M, X_1) | P_2$ XOR $H(T_3, M, X_2) | \ldots | P_{k-1}$ XOR $H(T_k, M, X_{k-1})$. The last component of Z is not needed, since a level d−k+1 router can obtain $P_k$ from X.

Routers generally route internal bound packets in the following manner. First the router checks the $P_0$ prefix bits of the destination address, to determine if the packet is bound for an internal address. If not, it will route the packet towards a top-level router, using a default route. If so, and no CPP hop-by-hop option is present, then the router checks the component of W according to its level. This information is preconfigured along with the other forwarding table information. If the router is not a crossover router, then it will forward the packet towards a border router using a default route.

However, suppose the router R is the crossover router for the packet. Then R will start with the first level component in Z (corresponding to the border router). This component is $P_1$ XOR $H(T_2, M, X_1)$. R is able to compute the key $T_2$ since it is the crossover router and therefore has the correct value for $L_1$ and $L_2$. (R is not a border router, else the previous inbound routing algorithm would be used). Therefore, R is able to obtain P1. In the same way, R is able to obtain the other PCs corresponding to higher levels in the tree than itself. Finally R obtains the prefix component for its own level using the inbound routing algorithm. R takes the concatenated prefix and forwards the packet based on it. It also includes the hop-by-hop option that contains the concatenated prefix. It is noted that since R is decrypting prefix components for levels in the tree closer to the border router, it will need to be configured with the maximal PC length for other routers, and possibly the PCs as well (for the other routers). (Also, if normalization is used, then R would need to have normalization maps for other routers, too.)

Therefore, when using this algorithm, it is advantageous for reducing the amount of configuration, if all strings of the maximal PC length are themselves PCs. Ideally, all PCs will also have a maximal PC length, for a given router. If all routers at a given level also have the same maximal PC length, then this will further reduce the amount of configuration needed. For example, a level 1 router R would check $U_{(1, k1)}$ XOR $V_1$ as follows:

Compute $V_1$ and $B = W_{(1,k1)}$ XOR $V_1$:

Then B is $U_{(1,k1)}$ if the target host belongs to an access router below R.

Routers that do not aggregate should forward internally bound packets up the routing graph using the default route. Only the level routers (with level keys) will route optimize packets destined for internal IP addresses.

Consider the following example as discussed in relation to FIG. 1. Two bits are required for the subnet prefix encoding, X. Two bits will be needed for Z. One bit is needed for W. A packet sent from the Internet to a host attached to R5 would pass through R1, R2, and R5. Let the secret $U_{(1, 2)}$ belonging to R2 consist of one bit. Then the secret $U_{(1,3)}$ belonging to the router R3 has the opposite value. (It is noted that R2 can, in this special case, deduce the value of router R3's secret, but it gives no additional information about the IP address location. In other words, if the IP address is not under R2, it must be under R3.) Accordingly, in this case, W consists of a single component with a single bit.

A packet sent from R4 to R5 would be forwarded to R2. Then R2 would check Y and obtain a match with its secret. After obtaining the match, R2 knows that the packet should be forwarded to a lower level in the graph. R2 decrypts the two components in Z in the destination address, to obtain the subnet prefix 01 (P1=0, $P_{2=1}$), and routes the packet based on this subnet prefix to R5.

Illustrative sizes of the IP address components in an exemplary optimized system of the present invention are as follows. The IP address A is of the form:

A=($P_0$, v, X, W, Z, M)

The number of bits needed for W is greater than the number of bits needed for X. This is apparent because, in the case of a routing graph which is a binary tree with d levels, the number of bits needed for W is the sum of the log of the number of bits at each level. Therefore, $$|W| = \sum_{j=1}^{d-1} \log(d-j) = \sum_{j=1}^{d-1}(d-j) = d(d-1)/2$$

Stated differently: $|W| = \sum_{j=1}^{d-1} \log_2(d-j) = \sum_{j=1}^{d-1}(d-j) = d(d-1)/2$ For a limited number of levels (4-5), the number of additional bits needed is not that great. For example, if a routing tree existed with 1 router at level 4, 8 routers at level 3, 64 routers at level 2, 128 routers at level 1, and 512 access routers, then X requires 12 bits, while W needs 16 bits. If the number of bits for W must be limited due to the number of IP addresses that are needed (which is determined by the size of M), then one option is to only use route optimization for the bottom levels in the graph.

As described above, X has 16-18 bits (X has greater than 16 bits if normalization is used). W contains the crossover secrets. Suppose 26 bits is sufficient for W. One bit is used to indicate the key version. One bit can be used to indicate the location privacy version (which can be dispensed with if a separate P0 global prefix is used to identify location privacy addresses). $P_0$ may require 48 bits. Suppose Z contains 14 bits. Therefore, 20 bits are left for the address allocation server to assign to M. No two distinct IP addresses, with the same prefix, should have the same M component.

A special subcase of the fully optimized routing example provides improved performance and security properties for some access networks. It is recommended that networks employing the instant invention be organized so as to permit this special subcase to be employed, if possible. In this example, Y=W. In other words, the Z component is not present in the IP address. Therefore, approximately 14 bits associated with Z are saved (because Z is not used). As discussed previously, Z might leak some information (to routers in the privacy domain) about the location of the IP address. Accordingly, removing Z also provides a security benefit.

In the special subcase where Y=W, a router, when forwarding a packet destined for an address in the privacy domain, checks if it is the crossover router using W. If not, the router forwards the packet up the default route (after attaching the hop-by-hop option as described below). If it is the crossover router, the router decrypts the X component corresponding to its level. The special case occurs because the crossover router is always able to forward the packet based on the single X component according to its level.

The hop-by-hop option is used by to indicate which bit to end the decryption at. Each router uses the offset field in the hop-by-hop option to indicate which bit that the next hop should end its decryption at, in terms of the X component. Also, no PC is a suffix of another PC, so that the router can decrypt the maximal size PC (with the last bit equal to the ending bit), and then search its list of PC's to obtain the correct PC. The hop by hop option (which may be hereafter referred to as the OR hop-by-hop option) has the same format as the CPP hop-by-hop option, except it does not have the encrypted prefix field and the target level field is replaced with a one byte inbound routing indicator field, and the length is 4 bytes. For the special subcase, it is assumed that all routers in the graph are level routers, and that, also, a router maintains the levels of each of its layer 2 link peers.

When utilizing the optimized routing state, the router always forwards the packet to a router with a level equal to its own level plus one when the inbound routing indicator equals zero, and forwards the packet to a router with a level equal to its own level minus one when the inbound routing indicator equals one. (FIG. 7 illustrates how a router enters the optimized routing state (corresponding to the case where there is no OR hop-by-hop option in the packet).) Also, a router that receives a packet with a OR hop-by-hop option is in the optimized routing state.

Unlike the fully optimized scheme and keyed hash variant scheme for optimized routing, the inbound routing algorithm is not employed once the crossover router is determined. That is because the OR hop-by-hop option will continue to be replaced in the packet with a new OR hop-by-hop option by each processing router, until the packet arrives at the destination access router. A difference is that the crossover router will set the inbound routing indicator field (IRI) equal to one, in the OR hop-by-hop option that it forwards, when it determines that it is the crossover router. All subsequent routers will set the IRI to one also. The significance is that the ending bit for decryption now becomes the starting bit for decryption, when the IRI field is equal to one.

Prior to the crossover router, the IRI is set to 0. Even if a router is not the crossover router, it must include the offset field in the hop-by-hop option. Therefore, it must decrypt the corresponding X component for its level, in order to obtain the ending decryption bit for the next level router.

Figure 12:
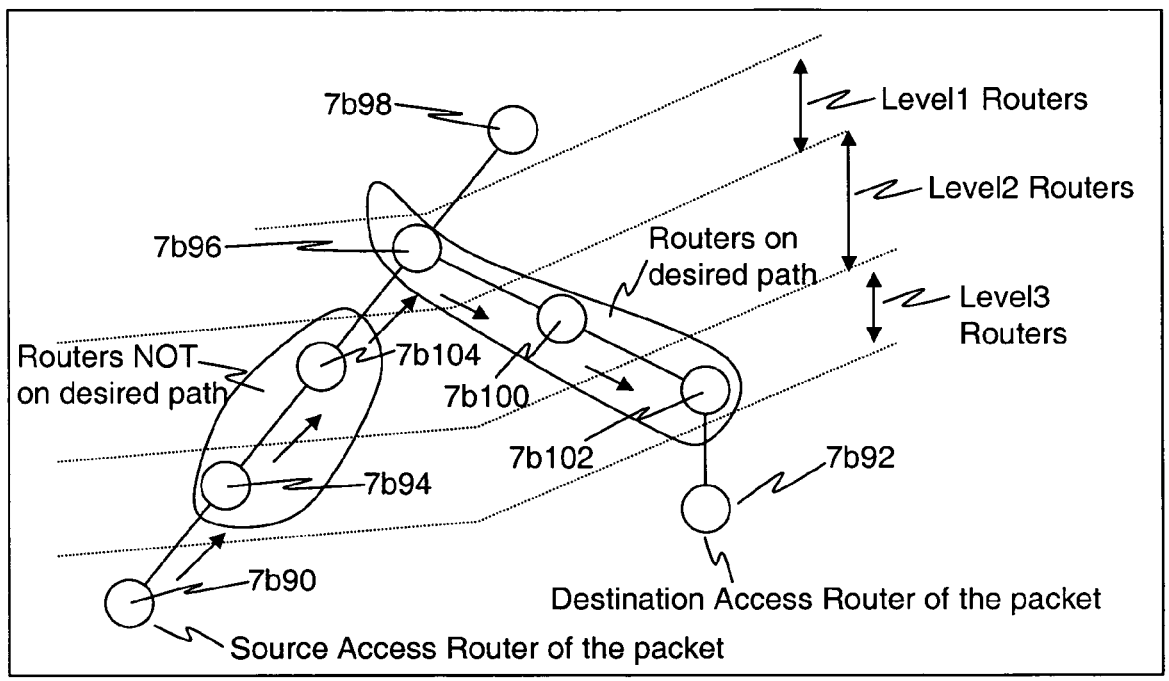
FIG. 12 illustrates an exemplary embodiment of the invention including optimized routing.

FIG. 12 illustrates an additional embodiment of optimal routing. In this embodiment, every router is configured with a unique key Kr known only to the router and an address generation server (address generation is discussed below in relation to FIG. 14).

In the additional embodiment illustrating optimal routing (in FIG. 12), a packet sent from an internal host is forwarded up the routing graph until it reaches a router that is part of the optimal path for the destination address. This router is called the crossover router, R (shown as element 7b96). The packet should be routed downwards at this point.

The crossover router R identifies that it is the crossover router for the packet by performing the standard Hash operation on the suffix of the packet, M, or a portion thereof, and truncating certain bits. The router then compares the result of the Hash operation with a predefined value, such as 0. Alternatively, certain bits in the address may be reserved for a pointer to a specific value, such as index to a list containing predefined values. If the specific value and result of hash and truncation is the same, then the router knows that it is a cross over router. An example of Hash truncation is shown below:
RESULT=TRUNCATE (HASH (Kr, M)
VALUE=(pre-specified value) OR (table [index-contained-in-the-address])
If RESULT==VALUE, then cross-over router.

Figure 13:
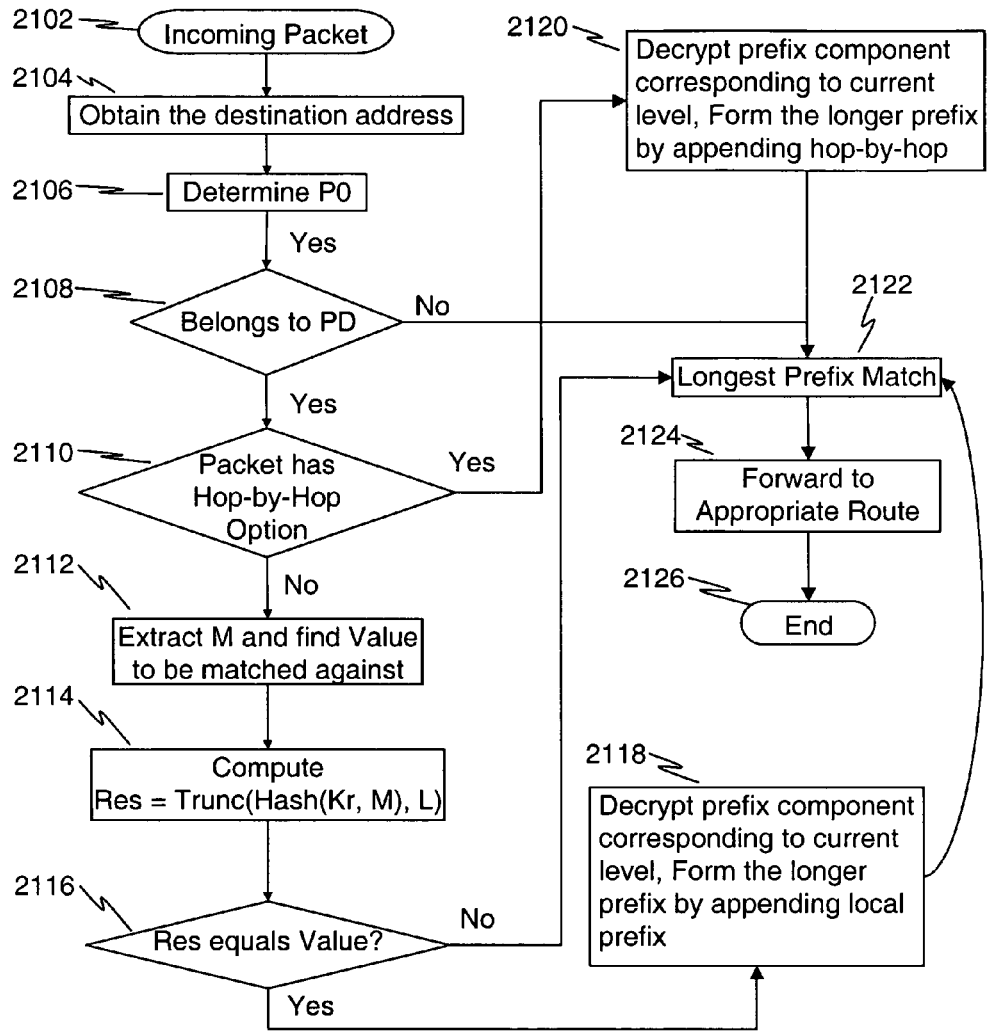
FIG. 13 illustrates an exemplary embodiment of the invention including CPP router functions.

In the above case proves true, then the router simply follows the optimized routing process as described previously in relation to FIG. 10, with a slight addition as shown in FIG. 13.

FIG. 13 is a flowchart that further illustrates the alternate optimal routing as first described in relation to FIG. 12. Any packet originally heading upward in the tree will likely not contain a hop-by-hop option indicating previously decrypted prefixes (that is, previously decrypted by higher levels of routers). Accordingly, this puts the cross over router in a situation similar to the border router when it does not have a decrypted higher level prefix.

The router obtains the decrypted prefix component corresponding to its level using its level key and concatenates the decrypted prefix component to a preconfigured higher level prefix. This higher level prefix is the concatenation of all the higher level decrypted prefixes. This concatenation gives the cross over router a sufficiently long prefix to perform the longest prefix match in its routing table such that it may find the next lower level router that the packet must be forwarded to. Once the next hop router has been determined, the cross over router may employ one of the following:

CASE 1: the cross over router forwards the packet to the next hop router (such as 7b100 shown in FIG. 12) and includes the newly formed concatenated prefix in the hop-by-hop header, which may be optionally encrypted using the key shared with the next hop router. In this case the next hop router can treat this packet just like any other packet containing a hop-by-hop option.

CASE 2: the cross over router forwards the packet to the next hop router and does NOT include the newly formed concatenated prefix in the hop-by-hop header. In this case the receiving router again performs the Hash truncation operation described above to determine if it is a crossover router as well. With this new type of addressing the router can regenerate the prefix (by decrypting the prefix component corresponding to its level and concatenating with the decrypted concatenation of the higher level prefixes), perform a longest prefix match in its routing table, and find the next hop router. (Note that CASE 2 is not shown in FIG. 12. Also, the router must not opt for CASE 2 if it is a router at a level just above the access routers.)

For the routers of the exemplary embodiment of FIG. 13 to be able to route packets correctly, the destination address will conform to following conditions.

The suffix M of the address to be routed to an access router AR is such that for all the routers R that fall on a desired or optimal path between the access router AR and the border router BR, and:
RESULT=TRUNCATE-((HASH (Kr, M), L) for all r in R
VALUE=(pre-specified value) OR (Table-L [index-contained-in-the-address])
RESULT equals VALUE if and only if r in R.

Here L is the level of the router r. TRUNCATE (NUMBER, L) would truncate the NUMBER to a desired number of bits corresponding to level L. Typically the number of bits corresponding to L will be Ceil (log2 of number of routers at level L). A separate table may be maintained for each level L, denoted by Table-L. Kr is the unique key of the router r. This key is generally different from the level keys and the link keys described before. These keys may be versioned as the other keys. Key versioning methods as described elsewhere in the present application may also apply.

Now consider an address generation server, useful, for example, for the network as previously described in relation to FIG. 12. An address of suffix M can belong to the access router 7b92 if the following is true:
TRUNCATE-((HASH (Key7b96, M), 1) equals Value1
And
TRUNCATE-((HASH (Key7b100, M), 2) equals Value2
And
TRUNCATE-((HASH (Key7b102, M), 3) equals Value3
And
TRUNCATE-((HASH (Key7b104, M), 2) NOT equals Value2
And
TRUNCATE-((HASH (Key7b94, M), 3) NOT equals Value3
Where Value1, Value2, Value3 are the desired values at the levels 1, 2, and 3 respectively, assuming 7b96 belongs to level 1, 7b104 and 7b100 belong to level 2, and 7b94 and 7b102 belong to level 3. Key7b94, key7b96, key7b100, key7b102 and key7b104 are unique secret keys of routers 7b94, 7b96, 7b100, 7b102 and 7b104 respectively.

Given the previous condition for M, and that the address generation server is aware of the network topology and the unique secret keys of each of the routers in the network, the address generation server can determine the cross over routers for each access router, find the corresponding paths between the cross over router (s) and the access router, and compute sets of M as described above. The address generation server then concatenates these sets of M to the concatenation of encrypted prefixes and PO to form complete addresses. These address are then stored at the routers one level above the access routers (or alternatively they may be stored at the access routers).

Figure 14:
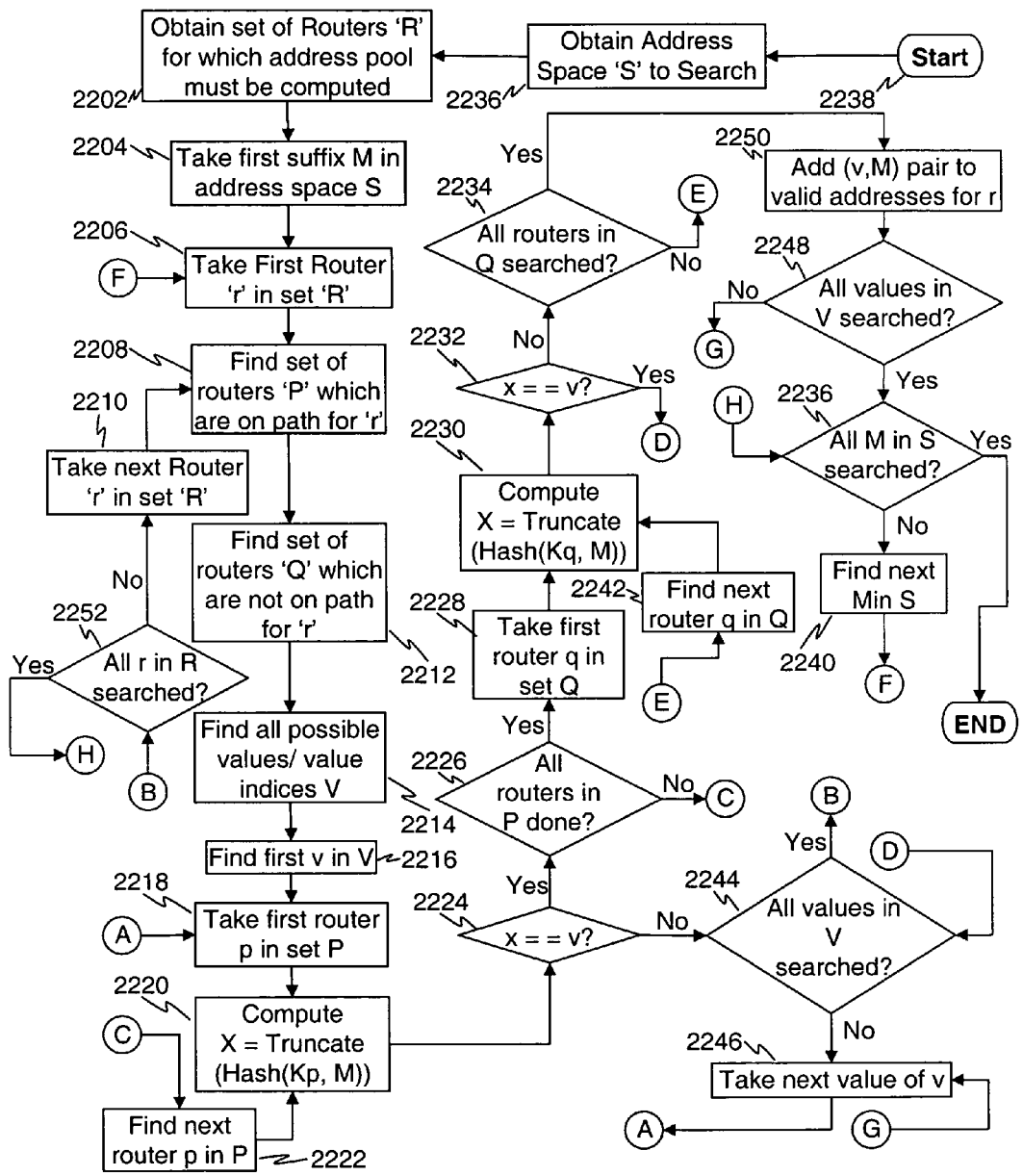
FIG. 14 illustrates an exemplary embodiment of the invention including routing address generation.

FIG. 14 shows an exemplary process of address generation by an address generation server. The address server must know the address space set S and the set of routers R (and related router topology information) before it can find any appropriate prefixes (as shown in functions 2236 and 2202). Once the previous information is known, the address server takes one M from the set S at a time and determines if that M is appropriate for any of the routers (as shown in function 2204).

In function 2208, the address generation server takes a router r from the set and finds the set of cross over routers for r. This is called set P. Further, the set of routers Q which are not considered cross over routers for r are discovered in function 2212.

Dependent upon whether a multivalue variant is used, a set V of possible values V is computed in function 2216. If a multivalue variant is not used, the set will have just one element. Further in function 2216, the address generation server takes one value v at a time and determines if for all routers in P Truncate(Hash (Kp, M)) equals v, as shown in functions 2218, 2220 and 2226. If every router in P satisfies this condition, the address server ascertains that for every router q in set Q, Truncate(Hash (Kp, M)) does not equal v, as shown in functions 2228, 2230, 2232 and 2234. If this condition is also satisfied then the pair (v, M) is also added as a valid suffix for router R in functions 2234 and 2250. These previous steps are repeated for other possible values of v in functions 2248 and 2246.

In function 2224, if any of the routers in P had failed the test then the (v, M) pair cannot be used for r. Then in function 2244, all other values of v are iterated until all are exhausted. Then, in function 2252, the next router is evaluated, until all routers in R are searched. When all the routers have been searched for a given M, the next M is evaluated (functions 2252, 2236, and 2240). Similarly to the situation in which a router q in Q had failed the condition in function 2232, wherein the pair (v,M) cannot be used for r, we iterate through the rest of the values in set V before discarding M for router r in function 2246 and testing it for other routers in R in functions 2244 and 2252.

Figure 15:
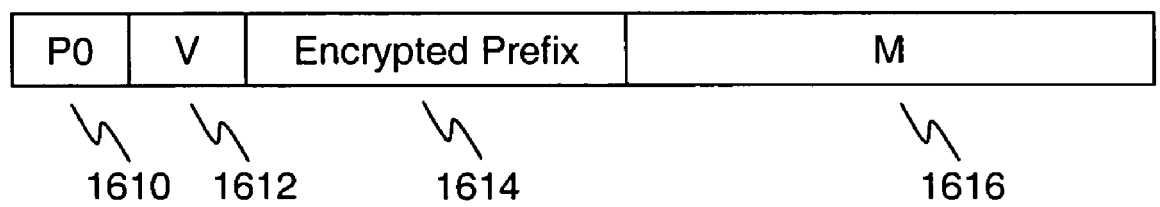
FIG. 15 illustrates an exemplary embodiment of the invention including an address structure for optimized routing.
Figure 16:
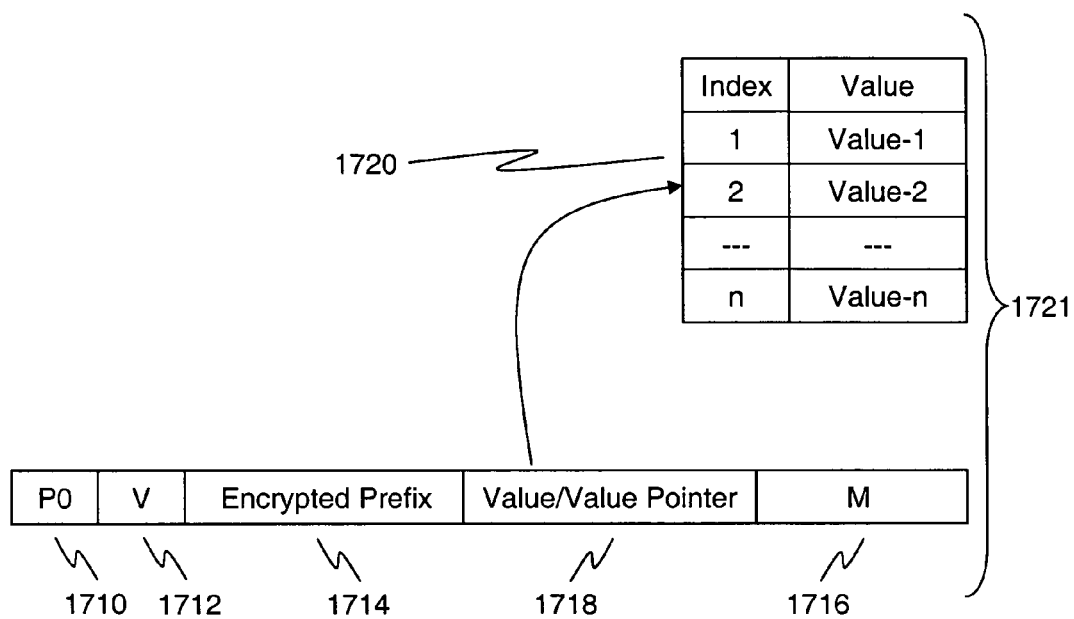
FIG. 16 illustrates an exemplary embodiment of the invention including an additional address structure for optimized routing.

FIGS. 15 and 16 show two possible structures of the address for additional optimal routing, for instance, that routing discussed above in relation to FIG. 12.

In FIG. 15, the address consists of the privacy domain prefix 1610, a bit 1612 that indicates the version of the key that corresponds to the IP address, and the concatenation of encrypted prefixes 1614, and the suffix M 1616. The address does not contain any pointer to a specific value such as an index to a specific entry in a table that has been previously determined. In the absence of a value, all routers (or at least all routers at a given level) must use a specific value that has been previously agreed upon. For IPv6, the length of M will typically be 62 bits, but any other value appropriate for the network may be used.

FIG. 16 depicts (through element 1721) an index table 1720 being pointed to by a value 1718 in an IP address. The address consists of the privacy domain prefix 1710, bit 1712 that indicates the version of the key that corresponds to the IP address, the concatenation of encrypted prefixes 1714, and the suffix M 1716. The address also contains a pointer 1718 to a specific value 1720 such as an index to a specific entry in a table that has been agreed upon or configured for routers at each level, or a specific value itself. Having a pointer or a specified value 1718 is desirable to improve the efficiency of the address generation server. With pointer 1718, the amount of computation that a address server must perform to find addresses needed for a given topology of routers is reduced by a factor of $2^n$ on the average, where n is the number of bits of the value or the pointer to the value. In the presence of 1718, the length of M is typically reduced to 62-m bits when using IPv6. However, an ordinarily skilled artisan understands that other values may also be used.

Figure 17:
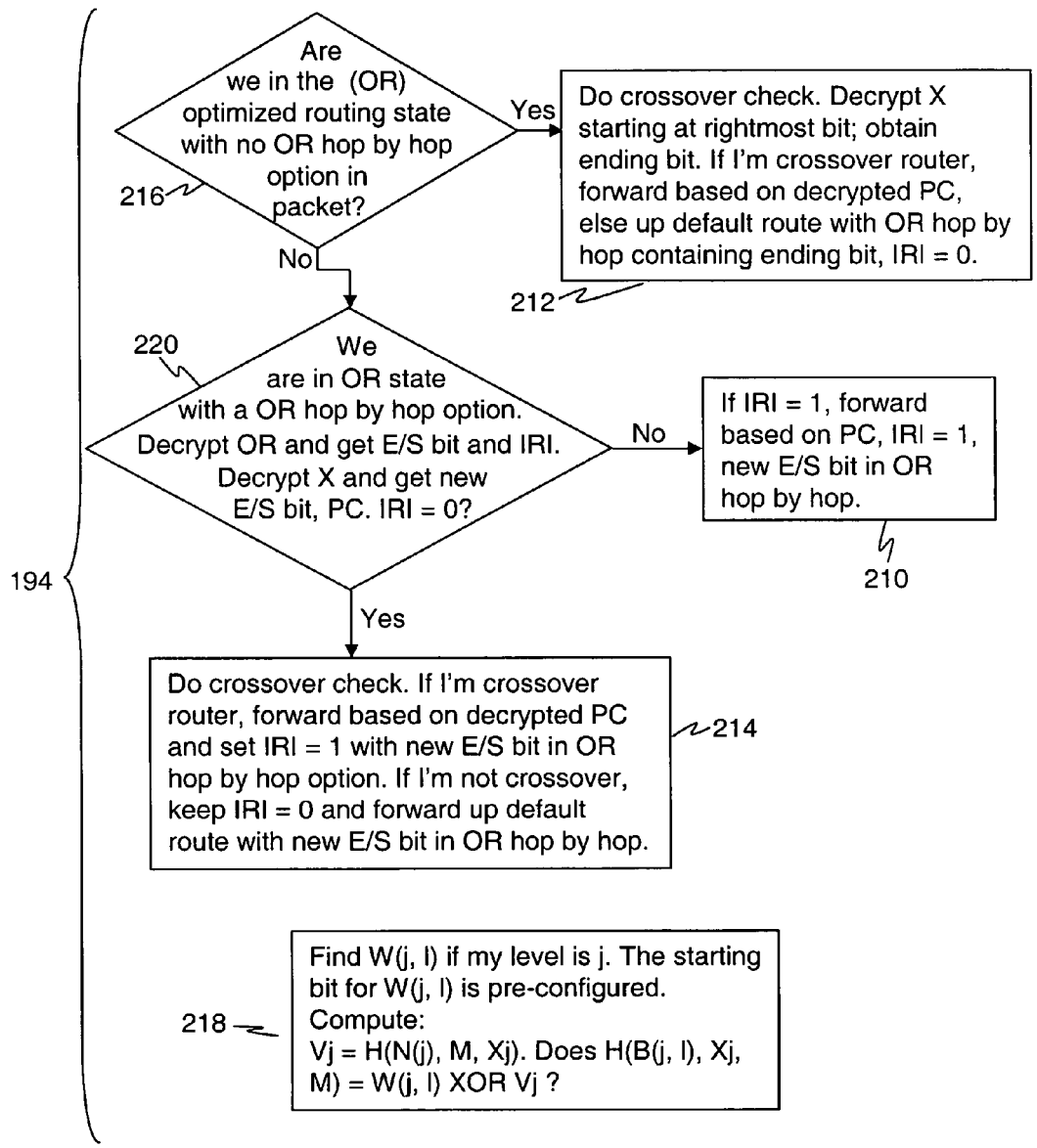
FIG. 17 illustrates an exemplary embodiment of the invention including a special subcase for optimized routing.

FIG. 17 illustrates a special subcase for optimized routing 194. If the router is in the inbound routing state for a received packet, it is within function 216. A router, upon receiving the packet without the OR type hop-by-hop option and arriving in the inbound routing state, is shown in function 212. The router performs the crossover check which is shown in function 218. Function 218 determines whether the router is in the crossover state as follows:

Find W(j, l) if my level is j.

The starting bit for W(j, l) is pre-configured. Compute: Vj=H (N(j), M, Xj). Does H(B(j, l), Xj, M)=W((j, l) XOR Vj? (Yes if and only if the router is the crossover router).

Then in function 212, after performing the crossover check, the router decrypts X starting at rightmost bit; obtaining the ending bit for its decrypted prefix component (PC). If the router is the crossover router, it forwards the packet based on the decrypted PC (by inputting the PC into FWalg*( ) to obtain the next hop router), else up the default route with the OR hop-by-hop containing the ending bit, and the inbound routing indicator (IRI)=0. When IRI=1, the E/S bit is a start bit and the router decrypts starting at the start bit and proceeding to the right. On the other hand, if IRI=0, then the E/S bit is an end bit and the router decrypts starting at the end bit and proceeding to the left. In this latter case, we need the property that no suffix of a PC is itself a PC (this property is explained below).

Otherwise the router must be in state 220 where the received packet has a OR hop-by-hop option. The router decrypts the OR hop-by-hop option and gets the end or start (E/S) bit and IRI. It decrypts X, starting at the E/S bit and gets the new E/S bit (where the new PC ends), and decrypts the PC. It then checks whether IRI from the hop-by-hop option equals 0. If not, then IRI=1 (as in function 210), and it forwards based on the decrypted PC, setting IRI=1 in the new hop by hop option that replaces the old one in the packet. The new OR hop-by-hop also includes the new E/S bit.

If IRI=0, then we are in state 214. A crossover check is then performed. If the router is a crossover router, forward based on decrypted PC and set IRI=1 with new E/S bit in OR hop-by-hop option. If not crossover, keep IRI=0 and forward up default route with new E/S bit in OR hop-by-hop.

It is noted that prefixes must never flow upward in the forwarding algorithm. If they did, higher-level routers could obtain the full decrypted prefix, thus defeating the privacy properties of CPP.

Based on the foregoing discussion the following proposition is self-evident: suppose that routers could forward inbound packets based on the prefix component encrypted in their level key. Furthermore, we suppose that suffixes of prefix components are themselves never prefix components. Accordingly, the above algorithm provides optimal routing within the privacy domain.

In the following embodiments, security considerations and keyed hash variant fully optimized examples of routing are provided.

It is noted that the U's leak information about the location of the address. An eavesdropper in possession of level router secrets could thus compute U's by capturing enough packets. This can be countered by replacing the U's in the above expression for W.

For instance, let $B_{(j,k)}$ be a secret key known to the key server and the kth router at level at level d+1−j. Suppose the optimal path for a packet P from the Internet includes level routers with the following secret keys: $B_{(1,k1)}$, $B_{(2,k2)}$, ..., $B_{(j,kj)}$. Then W becomes:
W=H(B(1,k$_1$),M) XOR V$_1$, H(B(2,k$_2$),M) XOR V$_2$, ..., H($B_{(j,kj)}$,M) XOR V$_j$, where H($B_{(j,k)}$,M) does not equal H($B_{(j,l)}$,M) when k does not equal l, and the number of bits chosen for Trunc(H($B_{(i,k)}$,M)) is equal to the base 2 log of twice the number of routers at level d+1−i.

For example, with 128 routers at level 1 in the above example, 14 bits would be used for the level 1 component of W. By increasing the number of bits, the potential number of collisions is also reduced between the hash function values at a single level. An ordinarily skilled artisan recognizes that the birthday paradox would indicate that collisions could be expected about 40-50% of the time, even with an increased number of bits. To handle this problem, the key server must test a given M with each level router by computing Trunc(H ($B_{(i,k)}$,M) for all routers at level d+1−i. M can only be used if there are no collisions in the calculated values. After checking level d+1−i, the key server checks level d+2−i, and so on, until level d−1 is successfully checked. M is only used if there are no collisions at all of the levels for which an optimized routing component is in W.

It is expected to lose just less than half of the M's at each level. So for four levels, less than 15/16 of the Ms would be lost. If M is 20 bits, there would be greater than 2^16 possible M's. Such an approach increases the size of each component. Thus there may only be enough bits for 1-3 levels of optimized routing with this approach. Optionally the W component may be prefixed with one or two bits indicating which components of W are present or not present. Another approach using this new scheme is to omit optimized routing for level 1 routers. In that case, it is probably enough bits for both levels 2 and 3, and, at a minimum, some left over bits to use for the U(j,k)'s at level 4. The U's leak less information at higher levels in the tree. In other words, we can use H($B_{(j,k)}$,M)) at levels 2 and 3, and $U_{(j,k)}$ at level 4.

Alternatively, we can use only the H($B_{(j,k)}$,M) at levels 2, 3, and any other higher levels for which bits remain. There are additional variations that are apparent to an ordinarily skilled artisan.

Consider again the example from above, including a routing tree with 1 router at level 4, 8 routers at level 3, 64 routers at level 2, 128 routers at level 1, and 512 access routers. Suppose P0 requires 48 bits, while X uses 16 bits, and Z uses 14 bits. M has 20 bits. Two bits are used for key version and indicating that the address is location privacy protected. Therefore, W has 28 bits. If route optimization at the level 1 routers is foregone, then the keyed hash variant of the fully optimized scheme uses 12 bits for level 2, and 6 bits are needed for level 3. So W requires 18 bits.

Alternatively, levels 1 and 2 can be optimized (using the keyed hash variant), wherein 14+12 bits are used (for a total of 26 bits). If U's are used for optimization at level 3, 3 more bits are needed for W. W has 28 bits and 26 bits have already been used. Therefore, we will borrow one bit from M, reducing it to 19 bits. M will be effectively just over 16 bits (due to the elimination of some M's due to collisions). Thus, over 65,000 IP addresses will be available, per subnet.

It is noted that in the above expression, H($B_{(i,ki)}$,M) can be replaced with H($B_{(i,ki)}$, $X_i$, M), 1<=i<=j. The advantage of this replacement is that it prevents an attacker who obtains H($B_{(i,ki)}$,M) from correlating the location information associated with this value and hosts that share the same M value. In other words, hosts that share the same M value may share the same H($B_{(i,ki)}$,M) for some values of i.

Figure 18:
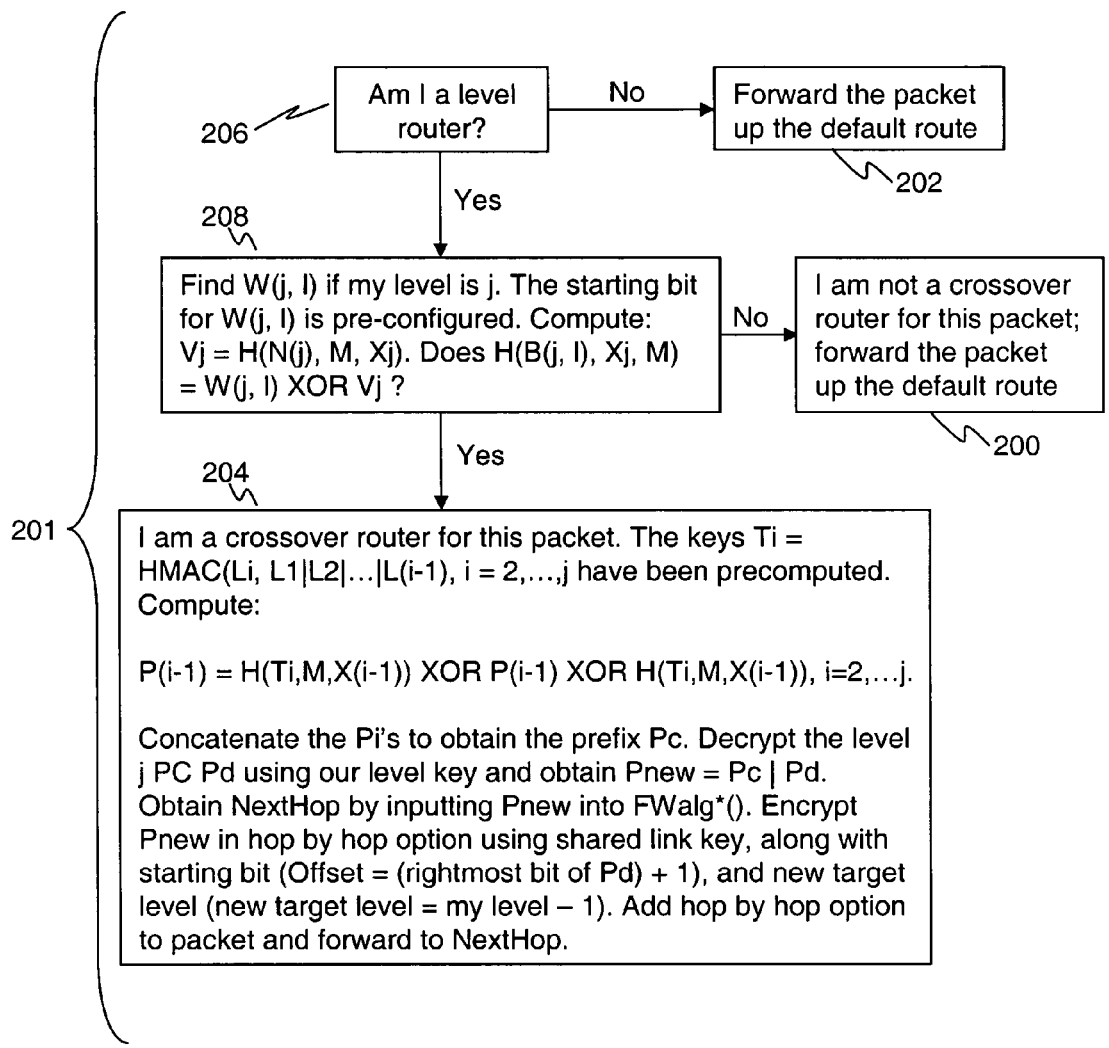
FIG. 18 illustrates an exemplary embodiment of the invention including an example of keyed hash optimized routing functions.

FIG. 18 illustrates a keyed hash routing variant of the present invention 201. The illustrated embodiment uses the H($B_{(i,ki)}$, $X_i$, M)'s, and the term keyed hash variant refers to this example. (As an aside, function 160 in FIG. 5 may indicate that the keyed hash is to be implemented.) In function 206 of FIG. 18, the processing router for the packet determines if it is a level router. If not, the router then forwards the packet up the default route in function 202. If it is a level router, the router performs function 208:

Find $W_{(j, l)}$ if the processing router's level is j. The starting bit for $W_{(j, l)}$ is pre-configured. Compute: Vj=H(N(j), M, $X_j$). Does H(B(j, l), $X_j$, M)=$W_{(j, l)}$ XOR $V_j$?

If the processing router for the packet determines that it is not a level router in function 208, the processing router goes to function 200 (because it is not the crossover router), and it forwards the packet up the default route. The processing router then goes to function 204 and performs the following steps: it is the crossover router for this packet. The keys Ti=HMAC($L_i$, $L_1|L_2|$ ... $|L_{(i-1)}$), i=2, ..., j have been precomputed. Compute:
$P_{(i-1)}$=H($T_i$,M,$X_{(i-1)}$) XOR $P_{(i-1)}$ XOR H($T_i$,M,$X_{(i-1)}$), i= 2, ... j.
Concatenate the $P_i$'s to obtain the prefix $P_c$. Decrypt the level j PC $P_d$ using level key and obtain Pnew=$P_c|P_d$. Obtain NextHop (the next hop router) by inputting Pnew into FWalg*( ). Encrypt Pnew in the hop by hop option using the shared link key, along with the starting bit (Offset=(rightmost bit of Pd)+1), and new target level (new target level=my level−1). Add the hop-by-hop option to the packet and forward to NextHop.

Since CPP has optimized routing, the traffic concentration points are avoided and tunneling overhead, such as that associated with Mobile IP and HMIPv6, is also avoided.

Figure 19:
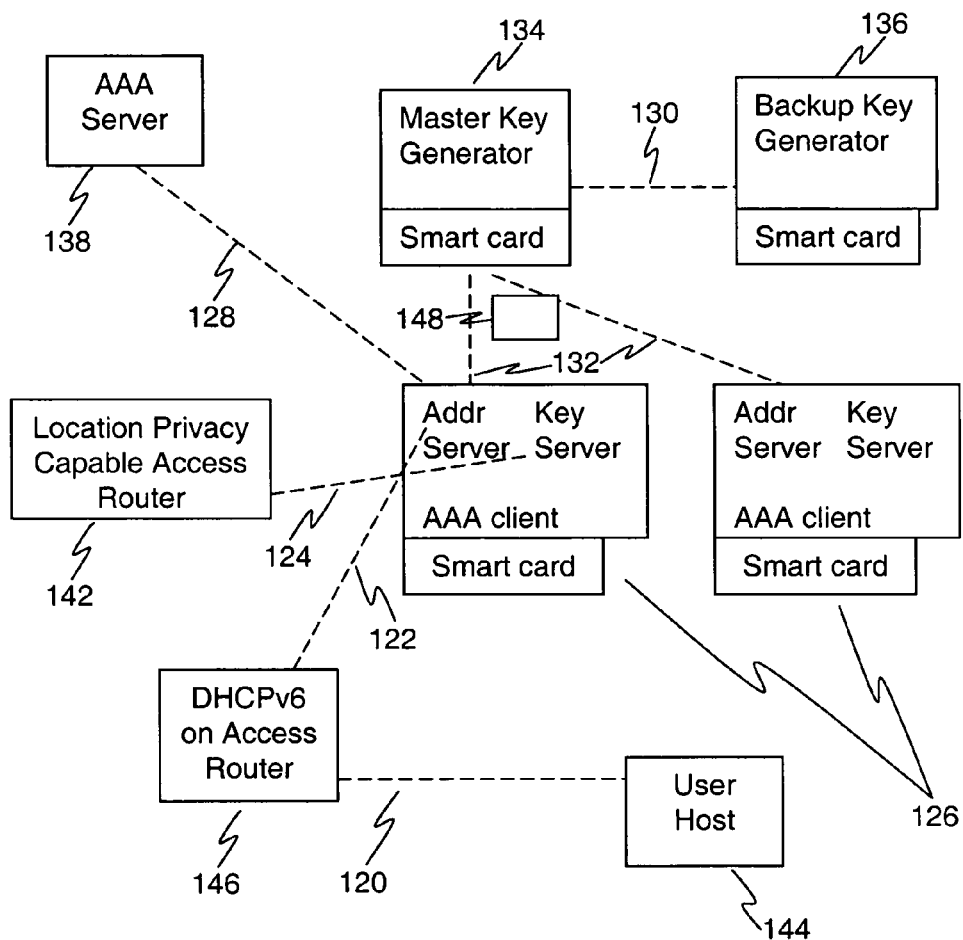
FIG. 19 illustrates an exemplary embodiment of the invention including example architecture components.

FIG. 19 illustrates example architecture components in an embodiment of the instant invention. The user host, 144, obtains its IP address from a DHCPv6 server, 146, co-located with the access router. This communication occurs over 120. (For additional protection against eavesdroppers on the local link, the communication over 120 should be encrypted, possibly using IPsec.)

Element 146 periodically obtains sets of CPP IP addresses (either basic or extended CPP IP addresses) from the address server, located on 126, via communications path 122. Once again, this communication can be protected using an encryption protocol (such as AAA (Radius/Diameter) or IPsec, for example). The AAA server is noted by element 138.

There are several sets of keys. In the basic CPP IP address, only level keys and shared link keys are needed. The shared link keys are established over layer 2 links, using any appropriate key management/distribution protocol (such as IKE, Kerberos, Radius/Diameter, or TLS, for example). The protocol should provide both mutual authentication and session key establishment. For extended CPP IP addresses, the following are added to the basic level ($K_i$) keys: crossover level keys ($N_i$), crossover secrets ($U_{(j,k)}$ and or $B_{(j,k)}$), and tree keys ($L_i$). As a group, these keys are called the CPP keys.

The CPP keys can be created on a Master Key Generator within a tamper proof smart card. The public keys of each of the key server host smart cards may have been manually entered into the Master Key Generator smart card. The smart cards may have keyboard pads and command line display interfaces. Private keys (corresponding to public keys in public key cryptographic algorithms) and secret keys never leave any of the smart cards. The exception to this rule is that the above CPP keys are output from the smart card to the host encrypted in a either a key known only to the smart card, or the TLS session key, shared with the target smart card.

Conversely, the public keys of the Master Key Generator, 134, and Backup Key Generator, 136, are manually entered into the smart cards of the address server/key server hosts. This manual procedure occurs only once in the life of the smart card. When new public keys are subsequently generated, they are output from the smart card, encrypted in the TLS session key of the target host smart card. The TLS session keys are also kept on the smart cards. The initial public key for the smart card is displayed on the command line interface, when the appropriate command is entered.

The architecture of the instant invention ensures that secret keys and private keys cannot become known to an antagonist/attacker, unless there is a successful physical attack on a smart card, a break in the TLS protocol, or a key is obtained from a CPP IP address or privacy domain router. The TLS protocol is implemented in the hosts (key server hosts, and master/backup key generator hosts). However, the hosts use an API that interfaces with the smart card for encryption and key operations. The hosts do not have access to any private or secret keys. The smart cards may also handle certificate aspects of a TLS protocol.

Certificates are all self-signed since the smart cards share public keys with each other. Therefore, the certificate operations are limited to name lookup and checking that the public key in the certificate matches the one associated with the name and stored on the smart card. Both the master key generator, and key servers build up a key cache containing the following elements:

Router ID1, crossover secretID1, (tree key11, router ID11), (tree key12, router ID12), . . . , level Router ID2, crossover secretID2, (tree key21, 1st router ID21), (tree key22, 2nd router ID22), . . . , level . . .

The first column lists all of the level routers. The ID for the router can either be a DNS name or a hash of the DNS name, or possibly an IP address. The second column contains the crossover secret ($U_{(j,k)}$) for the router. The next entries are the tree keys that the router distributes to its child routers. The last column contains the level for the router. Additionally, the key cache contains a doubly linked list of level keys, and doubly linked list of crossover level keys.

These secrets and keys are generated on the master key generator smart card. The master key generator server builds up this cache on the host. It is noted that the secrets and keys in the cache are in encrypted form. An example of the encrypted form for a secret or key is as follows:

[key version, {random 8 bytes (confounder), key length, key, timestamp (4 bytes)} Smartcard key] Smartcard key2

The notation { . . . } K denotes the encryption of the bytes contained in the parentheses using the secret key K. The notation [ . . . ]K2 indicates that . . . are integrity protected bytes using key K2 and a keyed integrity function such as HMAC. Therefore, no host ever has access to secret keys. Before transmitting the encrypted secret keys to the key server host, using the TLS protocol, the master key generator server sends the encrypted keys down to the smart card, along with the destination host name.

The smart card re-encrypts the keys using the TLS secret session key (the channel encryption key) that it shares with the destination host smart card. The master key generator server then sends the key cache data to the key server host. The timestamp in the above field is used to detect replays from malicious software on the host. The smart card maintains its own timestamp; all timestamp values in the encrypted keys must be later than this timestamp. Using the same encrypted key protocol, each key server on a key server host builds up a local key cache. This key cache is a copy of the one on the master key server host.

Alternatively, the key cache can be subset of the key cache on the master key server host. The key server host smart card will access the key cache (whether this cache is a copy of the master key server host cache or a subset of the key cache on the master key server host) when servicing requests from the address server.

The protocol between a key server and the master key generator server is next described. The following non-exclusive examples of request messages may be sent by the address server:
(1) crossover secret request message id, length, router ID;
(2) tree key request message id, length, parent router ID, child router ID;
(3) level key request message id, length, level;
(4) crossover level key request message id, length, level;
(5) public key update request message id, length; and
(6) optimized routing key update message, message id, router ID.

The following non-exclusive examples of response messages corresponding to the previous request messages may be returned:
(1) crossover secret reply message id, length, router ID, encrypted key;
(2) tree key reply message id, length, parent router ID, child router ID, encrypted key;
(3) level key reply message id, length, level, encrypted key;
(4) crossover level key reply message id, length, level, encrypted key;
(5) public key update reply message id, length, encrypted key; and
(6) optimized routing key reply message id, length, encrypted key, and other parameters.

A database exists with information about the routers in the privacy domain. A typical database entry contains the router DNS name, other router names or identifiers, prefixes owned by the router, level, parents of the router, children of the router, other layer 2 peers of the router, and link costs for directly attached links. The structure of CPP and/or extended CPP addresses is also stored here. For example, the number of bits used for the various components M, X, W, Z, is stored. Also, if any components of W are missing (for optimized routing), that information is stored as well.

The information in the database entry is protected both within the database, and as it transits the network. Other information may be present as well. Each address server accesses the above database to build up information about the routers and addresses. It builds an address server cache of the form:
prefix1 –>optimal route list of routers; $P_{11}, \ldots, P_{1k}$
prefix2 –>optimal route list of routers; $P_{21}, \ldots, P_{2k}$ The $P_i$'s are the prefix components corresponding to the prefix. The optimal list of routers contains the lowest cost path from a border router to the destination access router, for the prefix. The address server also makes periodic requests to the master key generator server for a block of M's. These M's are needed to build CPP IP addresses. These M's are encrypted and integrity protected using TLS. They are not made available in unencrypted form, to the host.

The interface between the address server and the smart card is as follows. The address server can make a request containing a $P_1, \ldots, P_k$, and a list of DNS names or other identifiers for the optimal route routers. The smart card will create and return the CPP IP address from this information. The smartcard queries the key server cache for router key information, in order to build the CPP IP address. These queries are indexed with either the router ID, or the level, when requesting level and crossover level keys.

The smart card can also query the address server for a block of M's. These M's remain encrypted and integrity protected until delivered to the smart card. It is –60-important that untrusted software not be able to modify the M's. In the event that the keyed hash variant of fully optimized routing is used, then the smart card must test each M by computing Trunc(H $(B_{(j,k)}, M))$ for each k corresponding to a router at level d+1−j, where Trunc indicates truncation to log of twice the number of d+1−j routers. If there are no collisions amongst these computed values, then M is acceptable for the d+1−j level. Each succeeding level is tested as well, and M is used only if there are no collisions at all of the levels.

Figure 20:
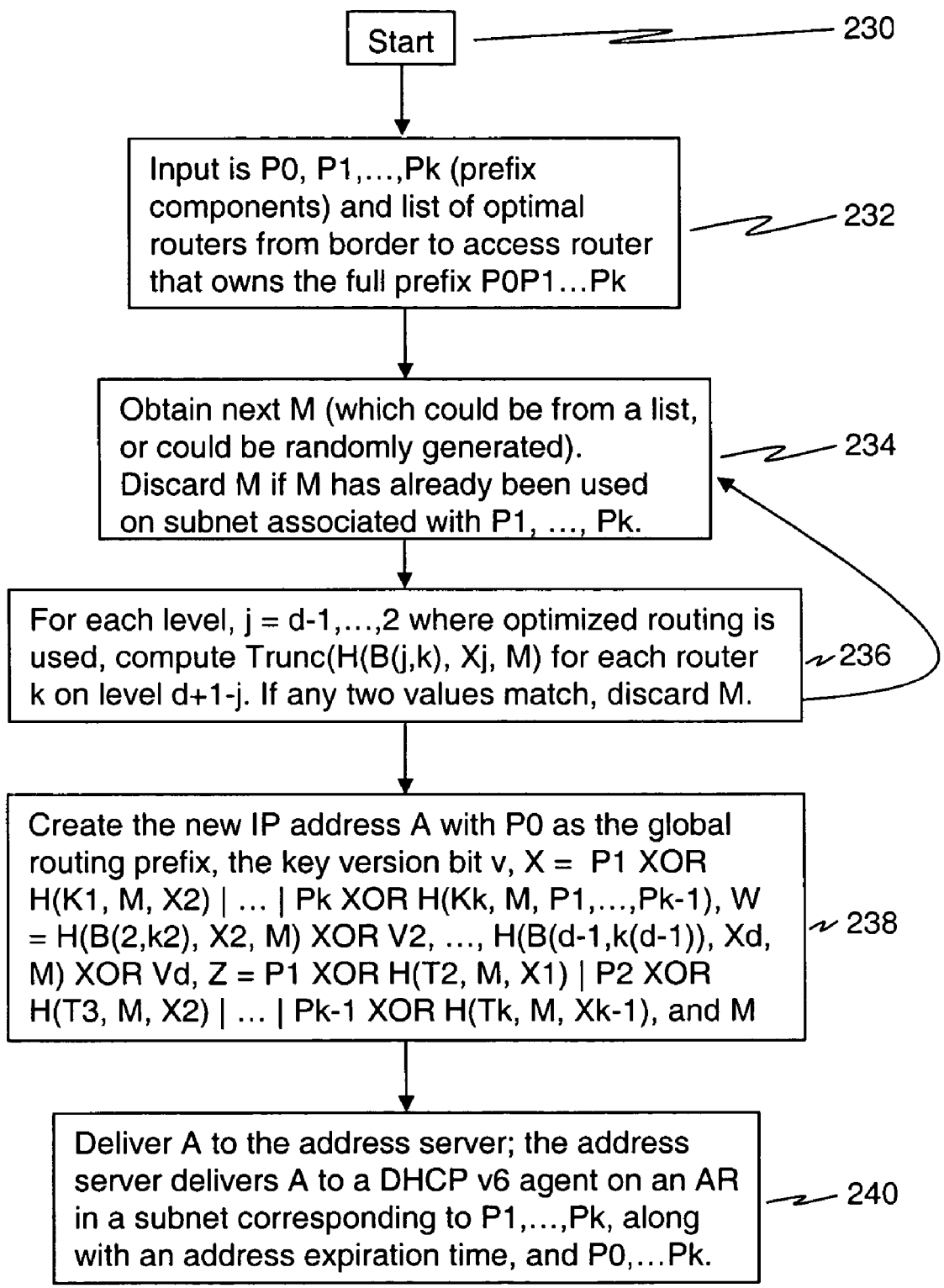
FIG. 20 illustrates an exemplary embodiment of the invention including example functions used to create an extended CPP address when a keyed hash variant of optimized routing is used.

FIG. 20 illustrates example functions for assigning an extended CPP IP address when the keyed hash variant of fully optimized routing is employed. The assigning entity (possibly executing in a smartcard on the address server host) starts in function 230. The input is listed in function 232 and includes address prefix components $P_0, P_1 \ldots, P_k$, as well as a list of routers that the packet would normally traverse (in the absence of network failures). (It is noted that a network failure does not prevent packets from being delivered to or from the address that will be created, but some packets may require an extra hop or so in the event of a network failure).

In function 234, M is selected. It obtains the next M (which could be from a list, or could be randomly generated). Additionally, M is discarded if M has already been used on the subnet associated with $P_0, P_1, \ldots, P_k$. If M is discarded, another M is selected by re-doing function 234. In function 236, for each level, j=d−1, . . . , 2 where optimized routing is used, compute Trunc(H$(B_{(j,k)}$, Xj, M) for each router k on level d+1−j. If any two values match, discard M. If M is acceptable for level d+1−j, decrement j and repeat the test. If M is discarded, return to function 234 to select a new M. Otherwise proceed to function 238.

In function 238, the extended CPP address A is created, and there is an M that has passed the tests in functions 234 and 236. Then, new IP address A with $P_0$ as the global routing prefix is created and the key version bit v (indicating the key version used to create this address), X=$P_1$ XOR H($K_1$, M, $X_2$)| . . . $P_k$ XOR H$(_{Kk}$, M, $P_1, \ldots, P_{k−1}$), W=H($B_{(2,k2)}, X_2$, M) XOR $V_2, \ldots$, H($B_{(d−1,k(d−1))}, X_d$, M) XOR $V_d$, Z=$P_1$ XOR H($T_2$, M, $X_1$)|$P_2$ XOR H($T_3$, M, $X_2$)| . . . $P_{k−1}$ XOR H($T_k$, M, $X_{k−1}$), and M.

In function 240, the CPP address A is delivered to the address server and the address server delivers A to a DHCP v6 agent on an access router (AR) in a subnet corresponding to $P_0, P_1, \ldots, P_k$, along with an address expiration time, and $P_0, \ldots P_k$. The CPP level router 142 (shown in FIG. 19) obtains keys from the key server over the communications path 124 (also shown in FIG. 19). The router must obtain these keys before the start of the new key period.

For example, the key period might have a length of one day. These keys will be encrypted using an encryption protocol (such as IPsec, TLS, Kerberos, or a AAA derived encryption protocol, for example). The protocol that distributes the keys must also provide mutual authentication. The protocol between the router and the key server includes the following fields: router (DNS name or other identifier), key use (level key, crossover secret, crossover level, or tree key), key type (algorithm), key, and version. The smart card will manage the session keys for the encryption protocol in order to prevent these keys from being available to the host. The CPP keys are encrypted in the encryption protocol session key on the smart card. The protocol code itself may be implemented on the smart card.

The master key generator periodically transfers status data to the backup key generator 136, over 130 (shown in FIG. 19). Such status data may include information about which servers the master has distributed M blocks too, and the values in these blocks. The backup can also build up a local key cache similar to the key servers. The backup takes over if the master fails. Both the backup and master are prevented, using a firewall 148 (also shown in FIG. 19), from communicating with any hosts except each other and the address/key server hosts.

The following describes the instant invention's interaction with ICMP (Internet Control Message Protocol). Standard IP tools for determining the path taken by packets, such as traceroute, compromise location privacy unless modified, or unless IPsec is used. Traceroute determines the topological location of a client by sending out packets with gradually increasing time to live (TTL) values until the correspondent on the other end of the connection is reached.

TTLs that are smaller than required to reach the correspondent are decremented to zero enroute. If the TTL value is decremented to zero, the router doing the decrementing sends an ICMP Time Exceeded message back to the source. The source address on this packet is the router where the TTL=0 was detected. An attacker could use such information to build up a topological to geographic map of the network.

In order to prevent unauthorized determination of location information, routers should refrain from sending Time Exceeded messages unless they can determine whether the sender is authorized to request topological information. The other ICMP error messages are in the same category; a router or a host must not send one of these messages for a host with a CPP address, unless the recipient is a known to have been authorized to receive the message. In particular, the recipient must be trusted with the mapping between the CPP address and its location. IPsec is a candidate protocol for providing authentication in this scenario.

The instant invention also provide protected against eavesdroppers on the local link, as explained herein. The CPP IP address must be encrypted on the local link, if protection against eavesdroppers on the local link is desired. For example, an IPsec tunnel can be used to tunnel packets from the host to the access router. The inner IPsec tunnel address is the CPP address. The outer tunnel address can either be:

(1) a topologically correct IP address—this enable enterprise routing to work better (on the other hand it exposes the host's location to malicious software on the host), or (2) a randomly generated IP address—this prevents malicious software from accessing a topologically correct IP address as in (1) (in this case, host routes have to be used).

For additional protection, the CPP routers can also use IPsec over their layer 2 links. Such provides additional protection against eavesdroppers on these links. In general, the eavesdroppers would need to trace an address from the host's local link up the forwarding path and try to view the CPP IP address in the clear on one of these links. IPsec encryption prevents this type of attack.

There are multiple deployment options for the present invention. For example, CPP routers can be implemented as overlay routers, and tunnels can be used. This avoids modifying all of the routers. Another option is to make only the border routers into level routers. Then these routers share the same secret key where the CPP prefix has only one segment. Such a router, upon receiving a packet, would decrypt the prefix to obtain the true destination IP address. The router would then enclose the prefix in the hop-by-hop option and forward it to the next hop. Other deployment options are apparent to the ordinarily skilled artisan.

Figure 21:
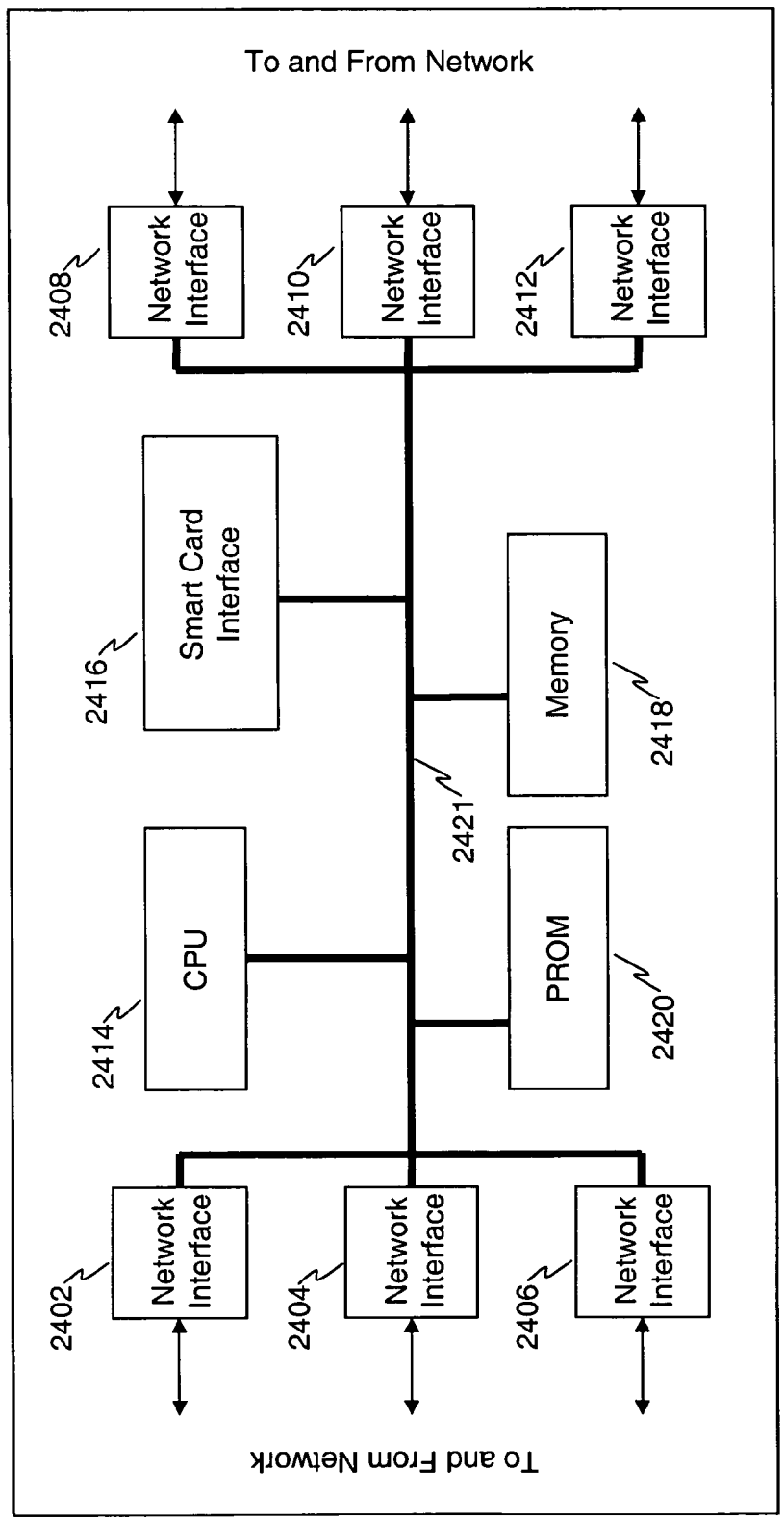
FIG. 21 illustrates potential hardware for implementing an exemplary embodiment of the invention in software.

FIG. 21 shows a possible implementation of a software based router. It consists of a number of network interfaces (six in this case 2402 . . . 2412) connected to bus 2421, including at least one Central Processing Unit (CPU) 2414, Volatile Memory 2418, Non Volatile Memory 2420 (such as a programmable read only memory), and a smart card interface 2416 for security and key related functions. The implementation may optionally have several other I/O interfaces such as key board, mouse, and displays. Such as system implements the logic and algorithms noted herein, and such implementation may be performed (in whole or in part) using software.

Advantageous characteristics of the present invention include:

(1) Protection against attacks from malicious software on the host, where the IP address is exposed to unprivileged, untrusted software;
(2) Protection against compromised routers, where the IP address space scrambling is vulnerable;
(3) Protection against eavesdroppers;
(4) Optimal routing and prevention of traffic concentration points/suboptimal routing;
(5) Robustness when network components fail, ensuring that packets continue to be delivered;
(6) Proof of security as shown by the basic inbound routing algorithm;
(7) Normalization which allows additional aggregations to be used outside the spanning tree, thus improving routing;
(8) Elimination of tunneling (the only additional overhead is the 6-8 bytes for the hop-by-hop option; such is a small fraction of the tunneling overhead required, for example, by HMIPv6 and Mobile IPv6); and
(9) No negative interactions with IPsec and other security protocols.

The previous description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof.

What is claimed is:

1. A network comprising:
a plurality of interconnected routers; wherein data is transmitted over said network through said interconnected routers; said data including an address, said address identifying at least a logical location of a destination of said data; wherein said address is divided into a plurality of pieces and at least a subset of said plurality of pieces are encrypted, and wherein said interconnected routers transmit said data along routes within said network based on decrypting different ones of said encrypted pieces at different points along each of said routes, and wherein address is divided at least in part by an aggregation of routers within a routing domain tree, wherein said routing domain tree is representative of the interconnections between said plurality of interconnected routers, said aggregation occurring to a plurality of routers which share a common parent route.

2. The network of claim 1, wherein a subset of said interconnected routers is enabled to decrypt at least a piece of said address.

3. The network of claim 2, wherein at least a first piece of said address is separately encrypted from the other pieces.

4. The network of claim 3, wherein said subset of said interconnected routers is unable to decrypt at least a different piece of said address than said first piece.

5. The network of claim 1, wherein said address is an IPv6 address.

6. The network of claim 1, wherein, during a first period, said interconnected routers are enabled to decrypt at least a piece of said address, and further during said first period, said interconnected routers are enabled to decrypt at least said piece of said address, or another piece of said address, during a second period.

7. The network of claim 2, wherein said subset of said interconnected routers are provided with a key to decrypt said at least a piece of said address.

8. The network of claim 7, wherein said subset of said interconnected routers comprises routers of the same level, and said key is shared by said routers of the same level.

9. The network of claim 7, wherein said subset of said interconnected routers comprises routers that share a common link, and said key is shared by said routers that share the common link.

10. The network of claim 7, wherein said subset of said interconnected routers comprises at least a crossover router.

11. The network of claim 10, wherein said key is shared by routers of the same level as said crossover router.

12. The network of claim 7, wherein said subset of interconnected routers are configured in a logical tree.

13. The network of claim 3, wherein said at least a first piece of said address is capable of being decrypted using a key.

14. The network of claim 1, wherein said address includes a property such that as a result of a hash function on said address, an expected value is produced, said expected value being representative of a desired path of said data to said destination.

15. The network of claim 14, wherein said expected value corresponds to a suffix of said address.

16. The network of claim 14, wherein said expected value is included in said address.

17. The network of claim 14, wherein said expected value is not explicitly contained in said address, but said address includes a pointer to said expected value, wherein said expected value is included in a table.

18. A network comprising:
a plurality of interconnected routers;
means for transmitting data over said network, wherein said data includes an address which identifies a destination of said data;
dividing means for dividing said address into a plurality of pieces;
encrypting means for encrypting at least a subset of said plurality of pieces, wherein said interconnected routers transmit said data along routes within said network based on decrypting different ones of said encrypted pieces at different points along each of said routes; and
aggregation means for aggregating routers within a routing domain tree, wherein said routing domain tree is representative of the interconnections between said plurality of interconnected routers.

19. The network of claim 18, wherein a subset of said interconnected routers comprise decryption means for decrypting at least a first piece of said address.

20. The network of claim 19, wherein said encryption means further includes separate encryption means for separately encrypting at least said first piece of said address from the other pieces of said address.

21. The network of claim 20, wherein said subset of said interconnected routers is unable to decrypt a different piece of said address than said first piece.

22. The network of claim 19, wherein said decryption means includes a key for decrypting said at least a first piece of said address.

23. The network of claim 22, wherein said subset of said interconnected routers comprises routers of the same level, and said key is shared by said routers of the same level.

24. The network of claim 22, wherein said subset of said interconnected routers comprises routers that share a common link, and said key is shared by said routers that share a common link.

25. The network of claim 22, wherein said subset of said interconnected routers comprises a crossover router, and said key is shared by said crossover router and at least an address generator server.

26. The network of claim 25, wherein said key is additionally shared by routers of the same level as said crossover router.

27. The network of claim 22, wherein said subset of interconnected routers are configured in a logical tree.

28. The network of claim 18, wherein said address is an IPv6 address.

29. The network of claim 18, further comprising first and second decryption means for separately decrypting at least a piece of said address, said first and second decryption means being provided to said interconnected routers during a first period, wherein said first decryption means is operable during said first period, and said second decryption means is operable during a second period.

30. The network of claim 18, wherein said address include a property such that as a result of a hash function on said address, an expected value is produced, said expected value being representative of a destination of said address on a desired path.

31. The network of claim 30, wherein said expected value corresponds to a suffix of said address.

32. The network of claim 30, wherein said expected value is included in said address.

33. The network of claim 30, wherein said expected value is not explicitly contained in said address, but said address includes a pointer to said expected value, wherein said expected value is included in a table.

34. A method for sharing data over a network, where said network includes a plurality of interconnected routers; said method comprising:
transmitting data over said network, said data including an address;
identifying in said address at least a logical location of a destination of said data;
dividing said address into a plurality of pieces;
encrypting at least a subset of said plurality of pieces, and wherein said interconnected routers transmit said data along routes within said network based on decrypting different ones of said encrypted pieces at different points along each of said routes, and wherein said encryption includes encrypting at least a first piece of said address separately from the other pieces;
decrypting at least the first piece of said address within a subset of said interconnected routers said subset of interconnected routers being unable to decrypt at least a different piece of said address than said first piece; and
dividing said address at least in part by an aggregation of routers within a routing domain tree, wherein said routing domain tree is representative of the interconnections between said plurality of interconnected routers, said aggregation occurring to a plurality of routers which share a common parent router.

35. The method of claim 34, wherein said address is an IPv6 address.

36. The method of claim 34, including decrypting at least a piece of said address during a first period, and, during said first period, receiving the ability to decrypt at least a piece of said address for a second period.

37. The method of claim 34, including providing said subset of said interconnected routers with a key to decrypt said at least a piece of said address.

38. The method of claim 34, including decrypting, with a key, said first piece of said address.

39. The method of claim 34, including sharing said key with routers of the same level, wherein said level is comprised of said subset of said interconnected routers.

40. The method of claim 34, including sharing said key with routers that share a common link, wherein said subset of said interconnected routers comprises routers that share a common link.

41. The method of claim 34, wherein said subset of said interconnected routers comprises at least a crossover router.

42. The method of claim 41, including sharing said key with routers of the same level as said crossover router.

43. The method of claim 34, wherein said subset of interconnected routers comprises routers of the same tree.

44. The method of claim 34, further including performing a hash function on said address, such that as a result of said hash function on said address an expected value is produced, said expected value representing a destination of said address on a desired path.

45. The method of claim 44, including corresponding said expected value to a suffix of said address.

46. The method of claim 44, wherein said expected value is included in said address.

47. The method of claim 44, including pointing to said expected value from a qualifier contained in said address, wherein said expected value is in a table that is separate from said address.

48. A router comprising:
a processor and a data path, wherein: data is transmitted to, through and/or from said router, said data being processed by said processor for transmission along said data path; said data being processed by said processor including processing of an address such that said address identifies at least a logical location of a destination of said data, said router being a router within a group of interconnected routers; wherein said processing includes said address being divided into a plurality of pieces wherein at least a subset of said plurality of pieces are encrypted, and wherein said interconnected routers transmit said data along said data path based on decrypting different ones of said encrypted pieces at different points along said data path, wherein said router is enabled to decrypt at least a piece of said address, and wherein at least a first piece of said address is separately encrypted from the other pieces, and wherein said router is unable to decrypt at least a different piece of said address than said first piece, and wherein said address is divided at least in part by an aggregation of routers within a routing domain tree, wherein said routing domain tree is representative of the interconnections between said group of interconnected routers, said aggregation occurring to a plurality of routers which share a common parent router.

49. The router of claim 48, wherein said address is an IPv6 address.

50. The router of claim 48, wherein, during a first period, said router is enabled to decrypt at least a piece of said address, and further during said first period, said router is enabled to decrypt at least said piece of said address, or another piece of said address, during a second period.

51. The router of claim 48, wherein said router is provided with a key to decrypt said at least a piece of said address.

52. The router of claim 51, wherein said router is a member of a subset of said interconnected routers comprising routers of the same level, and said key is shared by said routers of the same level.

53. The router of claim 51, wherein said router is a member of a subset of said interconnected routers comprising routers that share a common link, and said key is shared by said routers that share the common link.

54. The router of claim 51, wherein said router is a member of a subset of said interconnected routers comprising at least a crossover router.

55. The router of claim 54, wherein said key is shared by routers of the same level as said crossover router.

56. The router of claim 48, wherein said at least a first piece of said address is capable of being decrypted using a key.

57. The router of claim 51, wherein said router is a member of a subset of interconnected routers which are configured in a logical tree.

58. The router of claim 48, wherein said address includes a property such that as a result of a hash function on said address, an expected value is produced, said expected value being representative of a desired path of said data to said destination.

59. The router of claim 58, wherein said expected value corresponds to a suffix of said address.

60. The router of claim 58, wherein said expected value is included in said address.

61. The router of claim 58, wherein said expected value is not explicitly contained in said address, but said address includes a pointer to said expected value, wherein said expected value is included in a table.

* * * * *